(12) United States Patent
Matthews et al.

(10) Patent No.: US 11,016,015 B2
(45) Date of Patent: May 25, 2021

(54) PORE ANALYSIS

(71) Applicant: Porexpert Limited, Devon (GB)

(72) Inventors: Graham Peter Matthews, Cornwall (GB); Giuliano Maurizio Laudone, Plymouth (GB)

(73) Assignee: Porexpert Limited, Devon (GB)

( * ) Notice: Subject to any disclaimer, the term of this patent is extended or adjusted under 35 U.S.C. 154(b) by 0 days.

(21) Appl. No.: 16/753,539

(22) PCT Filed: Oct. 4, 2018

(86) PCT No.: PCT/GB2018/052827
§ 371 (c)(1),
(2) Date: Apr. 3, 2020

(87) PCT Pub. No.: WO2019/069078
PCT Pub. Date: Apr. 11, 2019

(65) Prior Publication Data
US 2020/0309668 A1    Oct. 1, 2020

(30) Foreign Application Priority Data
Oct. 5, 2017  (GB) .................................... 1716322

(51) Int. Cl.
*G01N 1/40*      (2006.01)
*G01N 15/08*     (2006.01)
(52) U.S. Cl.
CPC .................................. *G01N 15/088* (2013.01)
(58) Field of Classification Search
CPC .................................................... G01N 15/088
(Continued)

(56) References Cited

U.S. PATENT DOCUMENTS 7,277,795 B2 * 10/2007 Boitnott ................. G01V 11/00
 702/6
8,909,508 B2 * 12/2014 Hurley ...................... G06T 7/11
 703/9

(Continued)

FOREIGN PATENT DOCUMENTS

GB    2503736 A      1/2014
WO    2014006397 A2  1/2014

OTHER PUBLICATIONS

GB Search Report issued by Intellectual Property Office in connection to GB1716322.1 dated Mar. 20, 2018.
(Continued)

*Primary Examiner* — Ricky Go
(74) *Attorney, Agent, or Firm* — Levenfeld Pearlstein, LLC

(57) ABSTRACT

A pore analysis method is described which comprises the steps of generating a model of a medium, the model comprising a regular array of pores, the pores being connected to adjacent ones of the pores by throats, modifying the sizes of the pores and throats until the model of the medium is representative of the medium, simulating, using the model, the effect of percolation of the medium using a fluid at a first pressure, repeating the simulation step with progressively increasing intrusion pressures and noting, for each pore, the intrusion pressure at which intrusion of that pore occurs, and identifying, from the information relating to the intrusion pressure at which intrusion of each pore occurs and from the shape of the void size distribution, at least one pore that should be treated, during further analysis, as comprising a cluster of voids.

4 Claims, 18 Drawing Sheets

(58) Field of Classification Search
USPC .......................................................... 702/50
See application file for complete search history.

(56) References Cited

U.S. PATENT DOCUMENTS

| | | | | |
|---|---|---|---|---|
| 2006/0277011 | A1* | 12/2006 | Tardy | G06F 30/20 |
| | | | | 703/10 |
| 2015/0204770 | A1* | 7/2015 | Gribble | G01N 15/088 |
| | | | | 703/2 |
| 2016/0040531 | A1* | 2/2016 | Ramakrishnan | G01V 1/40 |
| | | | | 702/8 |
| 2017/0372470 | A1* | 12/2017 | Liu | G06T 7/60 |
| 2018/0119523 | A1* | 5/2018 | Wlodarczyk | E21B 49/00 |

OTHER PUBLICATIONS

G. Peter Matthews et al., Void Space Modeling of Mercury Intrusion Hysteresis in Sandstone, Paper Coating, and Other Porous Media, Journal of Colloid and Interface Science, Apr. 1, 1995, pp. 8-27, vol. 171, No. 1.

International Preliminary Report on Patentability issued by ISA/EPO in connection with PCT/GB2018/052827 dated Apr. 8, 2020.

* cited by examiner

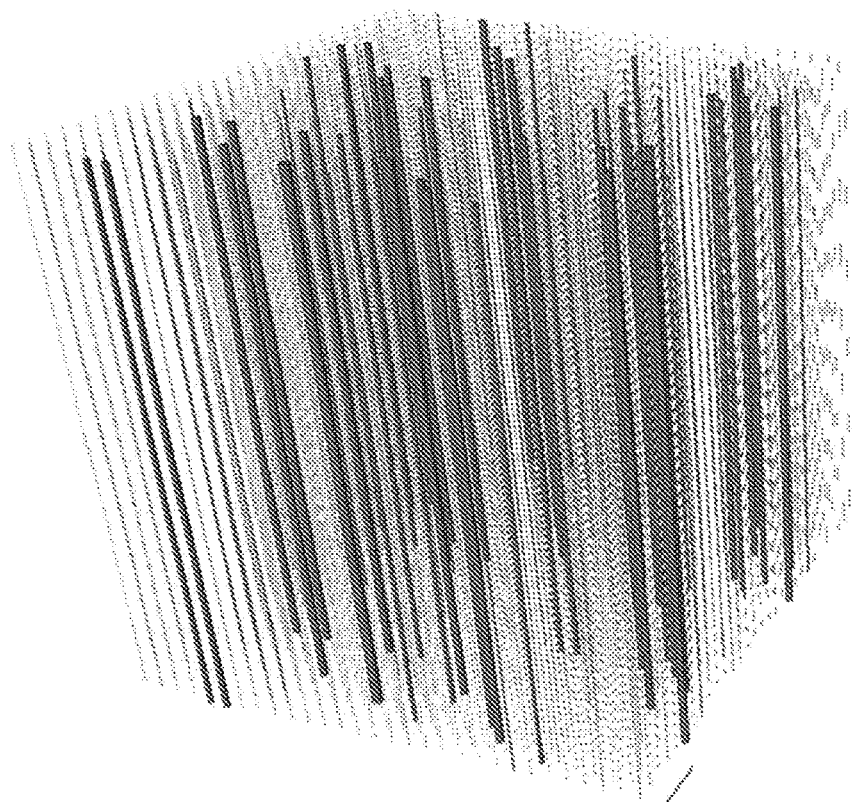
FIG. 1
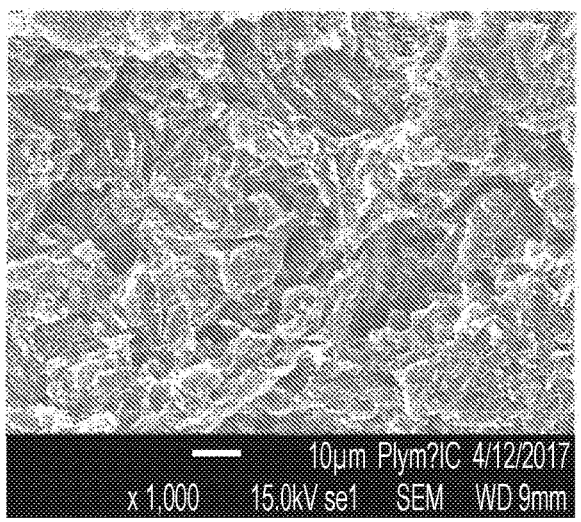 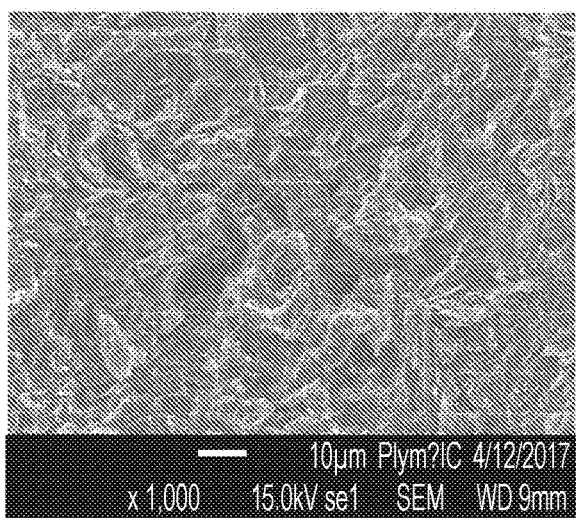
FIG. 2a  FIG. 2b

PORE ANALYSIS

This invention relates to a pore analysis method, and in particular to a method allowing improved interpretation of mercury intrusion and soil water retention percolation characteristics by inverse modelling and void cluster analysis.

There are two significant continuing fallacies in the interpretation of percolation characteristics of porous solids. The first is that the first derivative (slope) of the intrusion characteristic of the non-wetting fluid or drainage characteristic of the wetting fluid corresponds to the void size distribution, and the second is that the sizes of all voids can be fully resolved. The fallacies are illustrated and then substantially but not fully resolved with the aid of the PoreXpert® inverse modelling package.

The invention relates to a new void analysis method that may be used to interpret the percolation characteristics of a number of media. Its use in the analysis of three widely contrasting and challenging porous media is described. The first comprise two fine-grain graphites for use in next generation nuclear reactors. Their larger void sizes were measured by mercury intrusion, and the smallest by using a Grand Canonical Monte Carlo interpretation of surface area measurement down to nanometre scale. The second application is to the mercury intrusion of a series of mixtures of ground calcium carbonate with powdered microporous calcium carbonate (otherwise known as Functionalised Calcium Carbonate, FCC). The third is the water retention/drainage characteristic of a soil sample which undergoes naturally occurring hydrophilic/hydrophobic transitions. The findings are supported by other experimental characterisations, in particular electron and atomic force microscopy.

According to the present invention there is described a pore analysis method comprising the steps of:
- generating a model of a medium, the model comprising a regular array of pores, the pores being connected to adjacent ones of the pores by throats;
- modifying the sizes of the pores and throats until the model of the medium is representative of the medium;
- simulating, using the model, the effect of percolation of the medium using a fluid at a first pressure;
- repeating the simulation step with progressively increasing intrusion pressures and noting, for each pore, the intrusion pressure at which intrusion of that pore occurs; and
- identifying, from the information relating to the intrusion pressure at which intrusion of each pore occurs and from the shape of the void size distribution, at least one pore that should be treated, during further analysis, as comprising a cluster of voids.

By identifying which of the pores should be treated as comprising a cluster of voids, it will be appreciated that the accuracy with which the medium can be modelled is enhanced, and so information subsequently derived using the model can also be of better accuracy.

The invention will further be described, by way of example, with reference to the accompanying drawings, in which:

FIG. 1 is a view illustrating a Capillary bundle approximation of void structure, following a boxcar function, shown here on a regularly spaced Cartesian grid. Very narrow capillary tubes are shown dashed. The small scale bar shown at the base has length 229 μm;

FIG. 2 comprises electron micrographs of the nuclear graphites, at a magnification to show voids around 10 μm, the size of the scale bar;

Figure 6A:
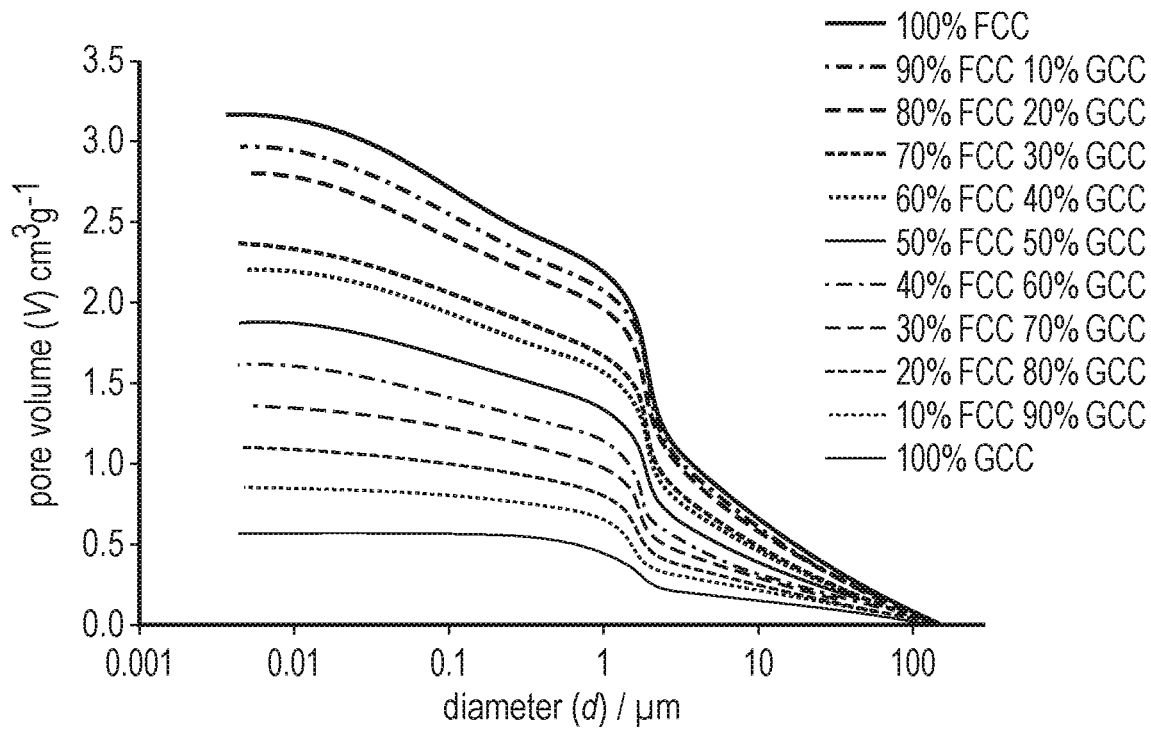
Figure 6B:
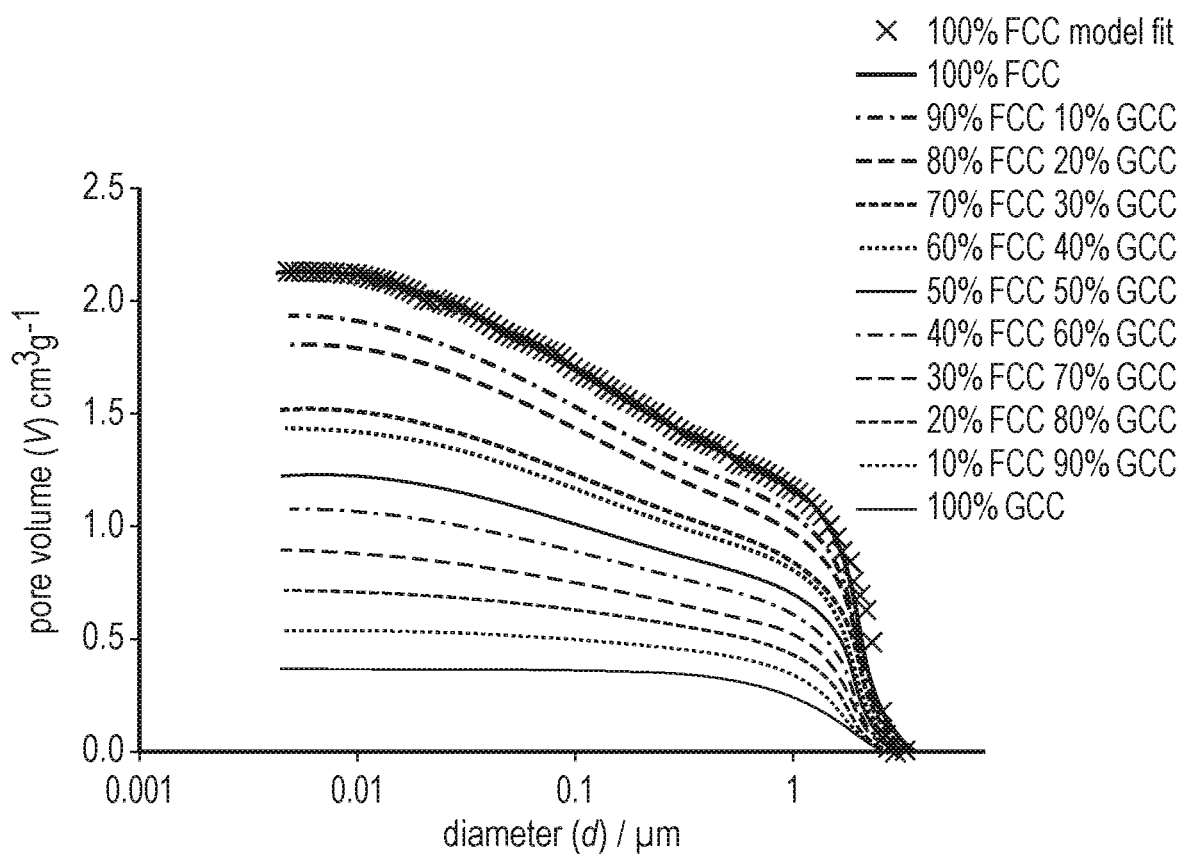
Figure 7:
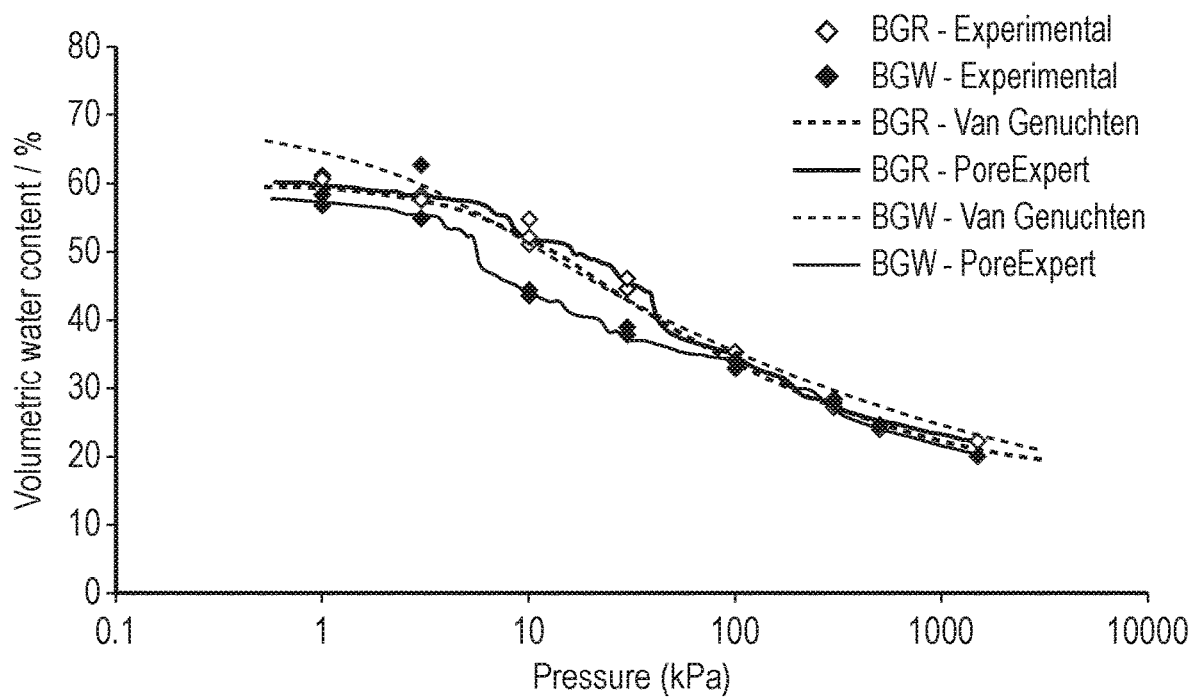
Figure 8:
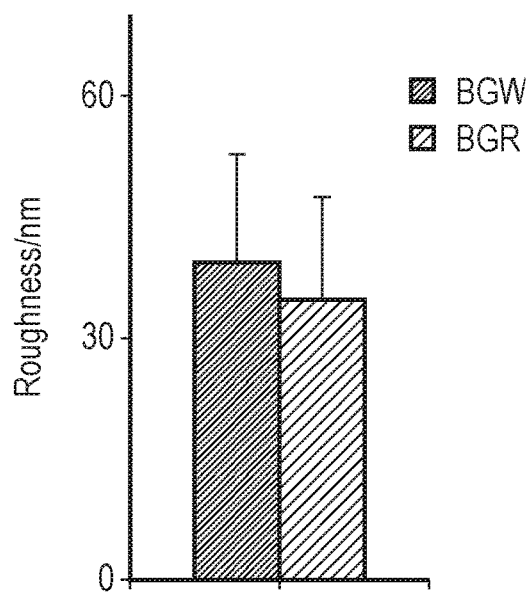
Figure 9:
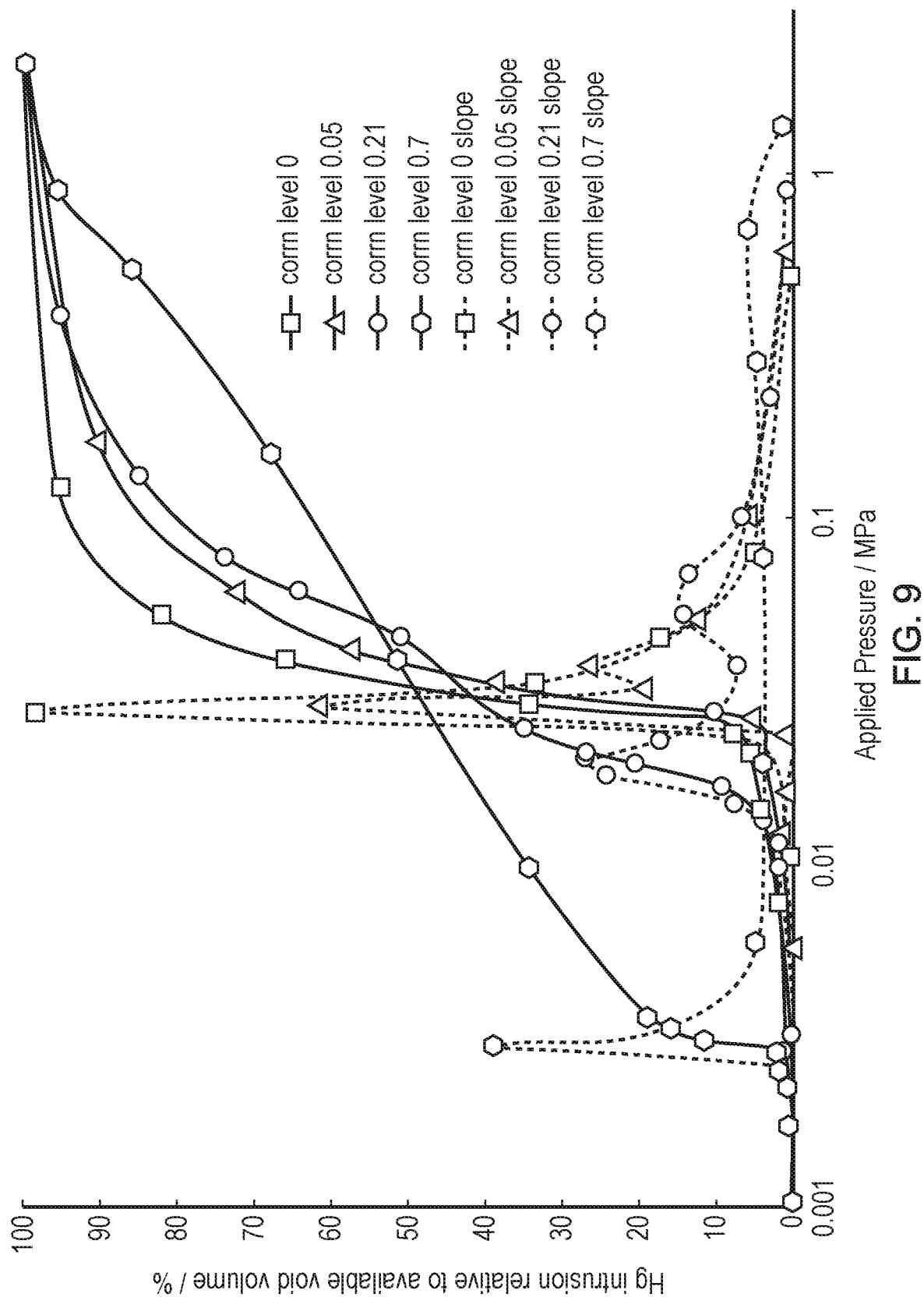
Figure 10:
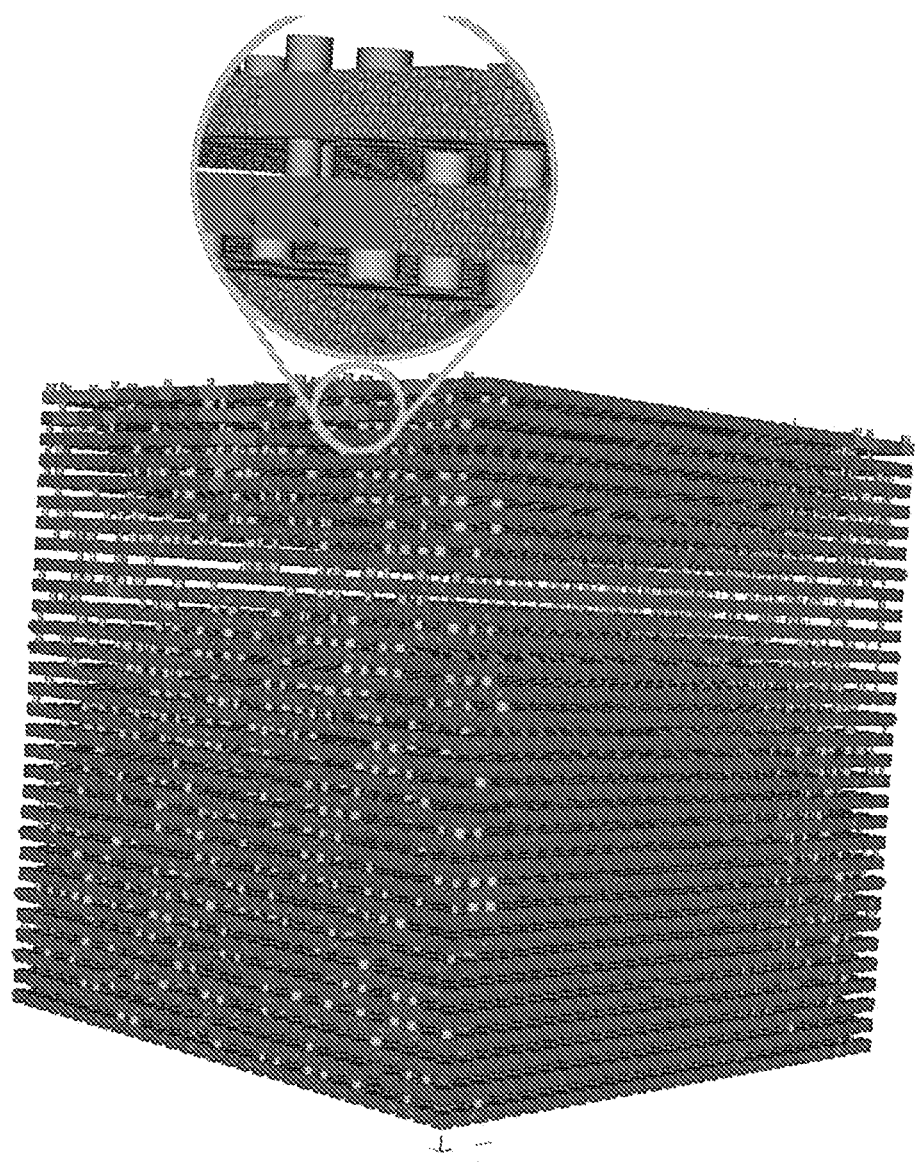

FIGS. 6a and 6b are FCC/GCC mixture intrusion curves, with pressures converted to exposed pore-throat diameters via equation 1. The ratios shown are mass percentages of each constituent. The closeness of fit of the model is illustrated by the fit to 100% FCC (X);

FIG. 7 shows experimental and modelled water retention curves for Botanic Gardens repellent (BGR) and wettable (BGW) soils;

FIG. 8 shows surface nano-roughness for BGW and BGR calculated on 25 μm2 areas from AFM measurements. BGW roughness=39.4±13.3 nm; BGR roughness=34.8±12.7 nm;

FIG. 9 shows percolation characteristics of the boxcar throat size distribution, expressed as mercury intrusion curves, for various values of correlation level C, and the slopes (first derivatives) of the intrusion curves;

FIG. 10 shows the unit cell of the boxcar throat size distribution with C=0.7, and Cr=2 as defined in Section 3.2. The solid phase is shown transparent, voids shown as solids, and clusters by a rendered pattern as shown in the detail. Most throats are hidden by their adjacent pores which are all of the same size. Mercury, intruded to 15.7% by volume into the top surface of the unit cell, is shown grey. The small scale bar at the base is of length 2261 μm.

Figure 11:
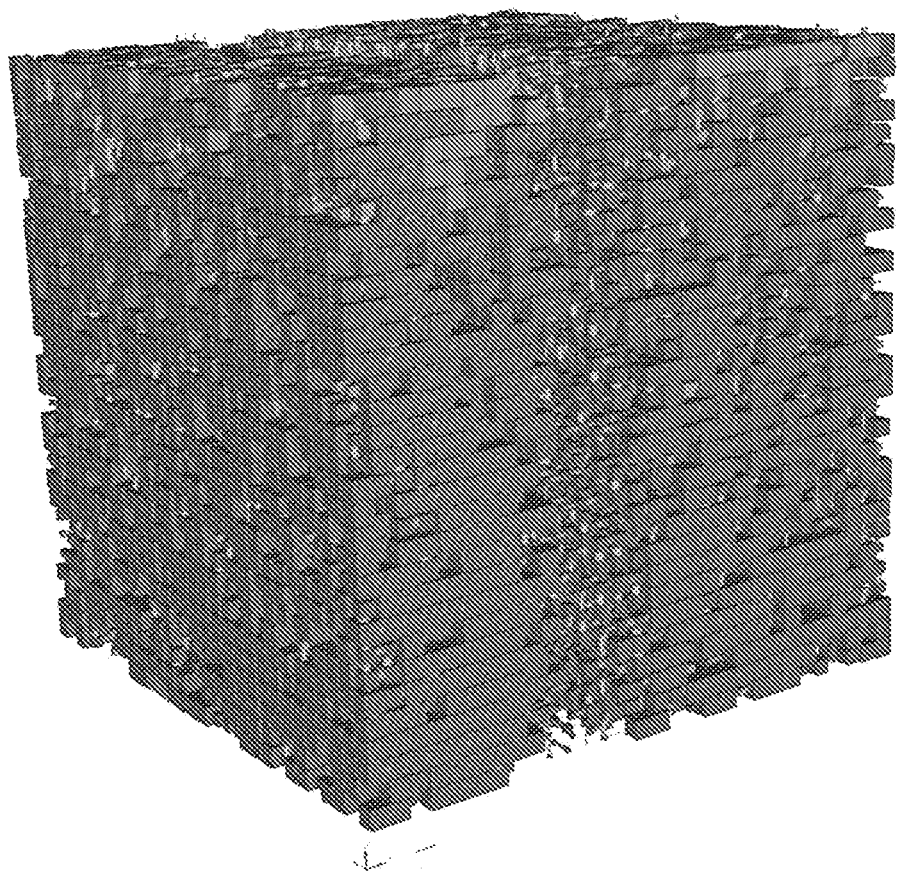
Figure 12:
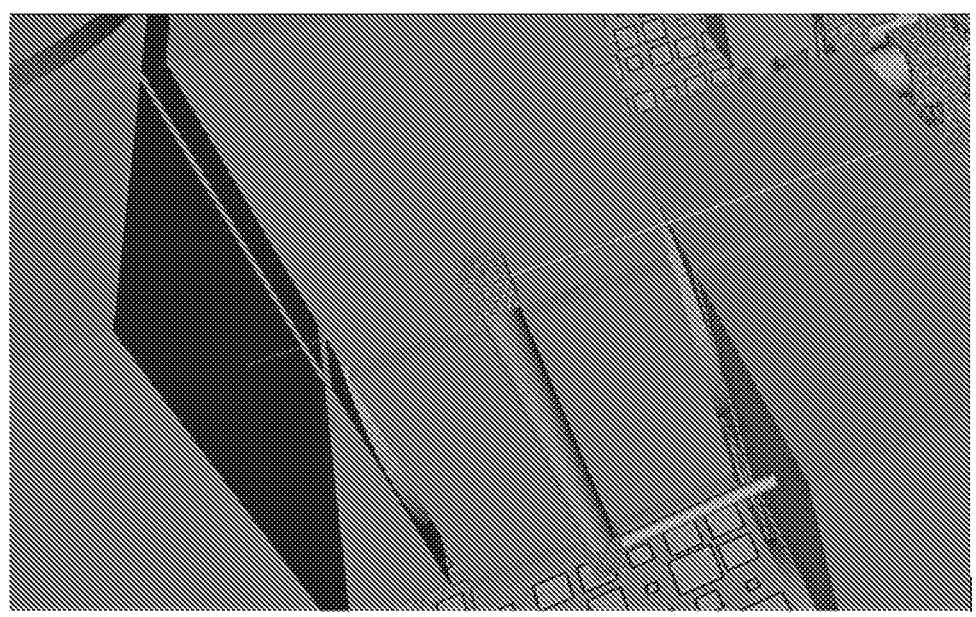
Figure 13:
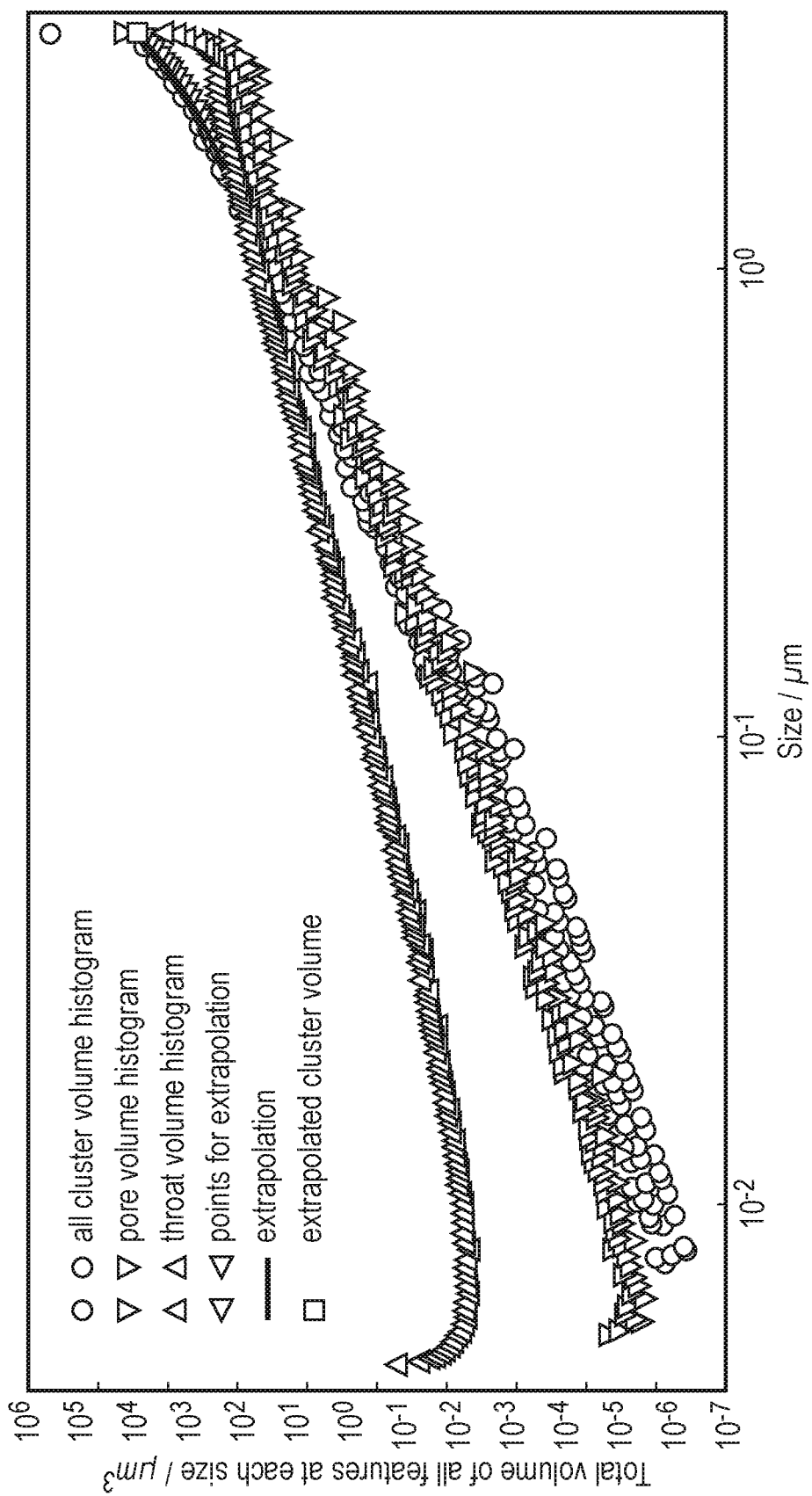
Figure 14:
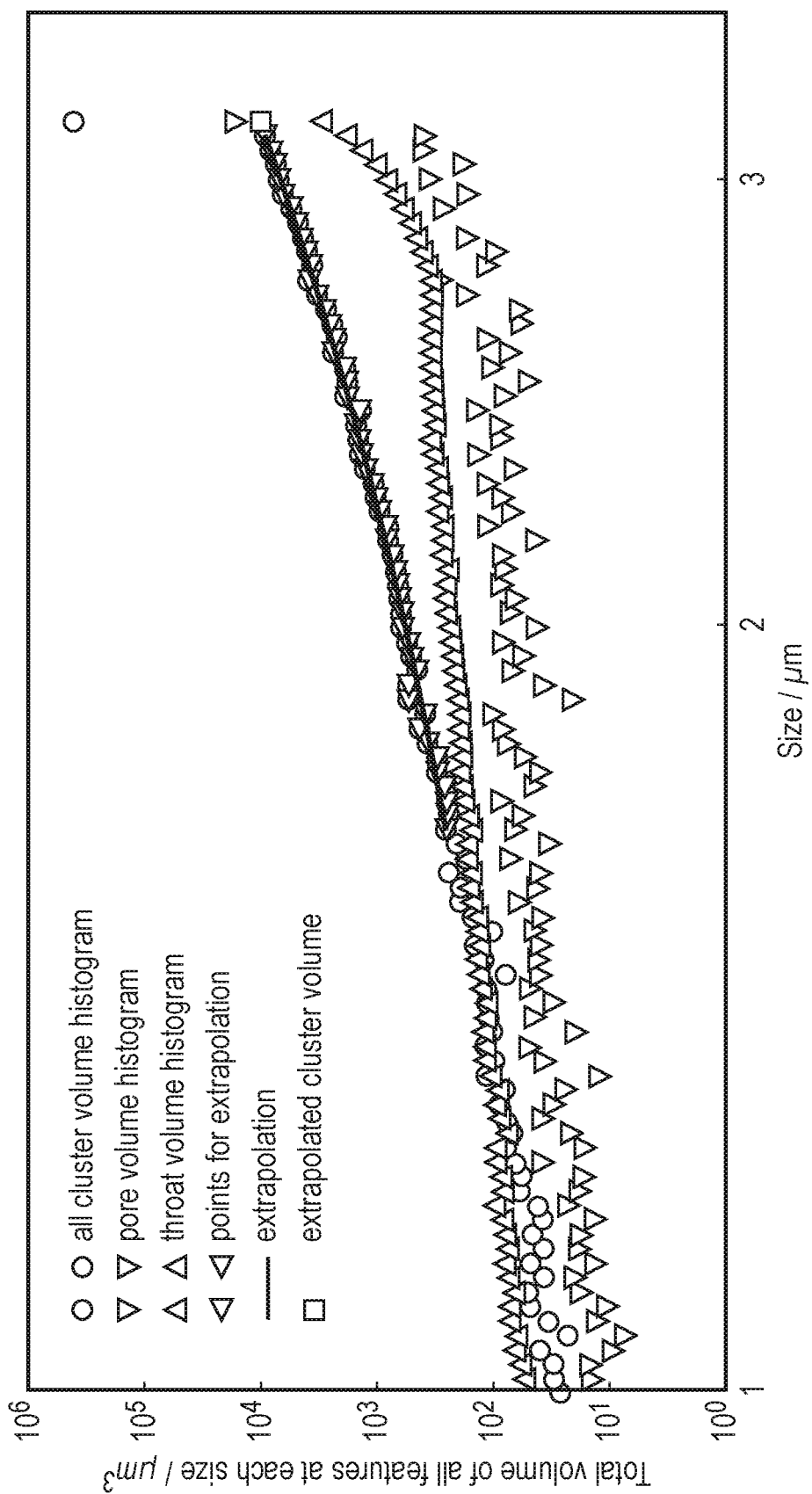
Figure 15:
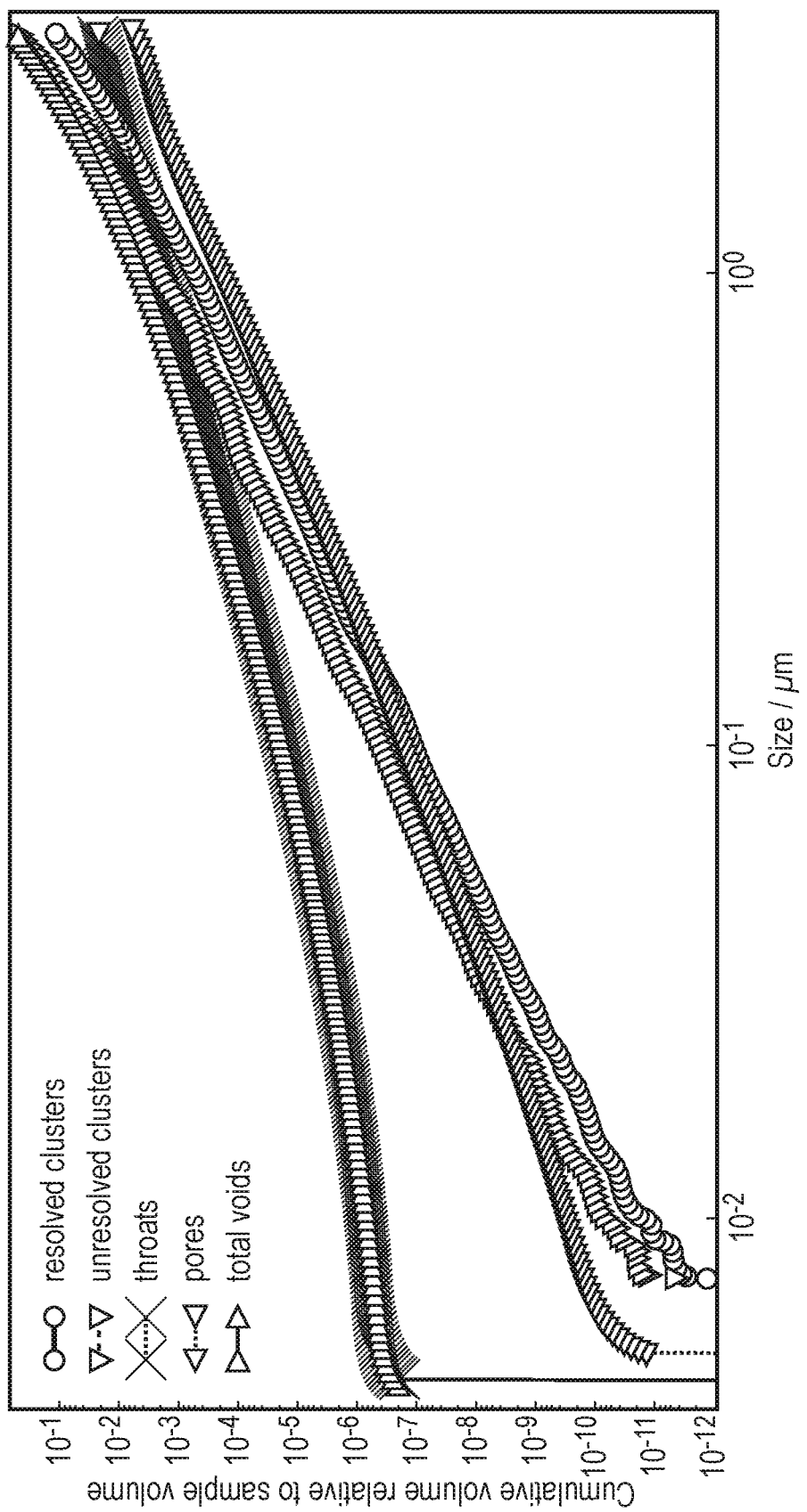
Figure 16:
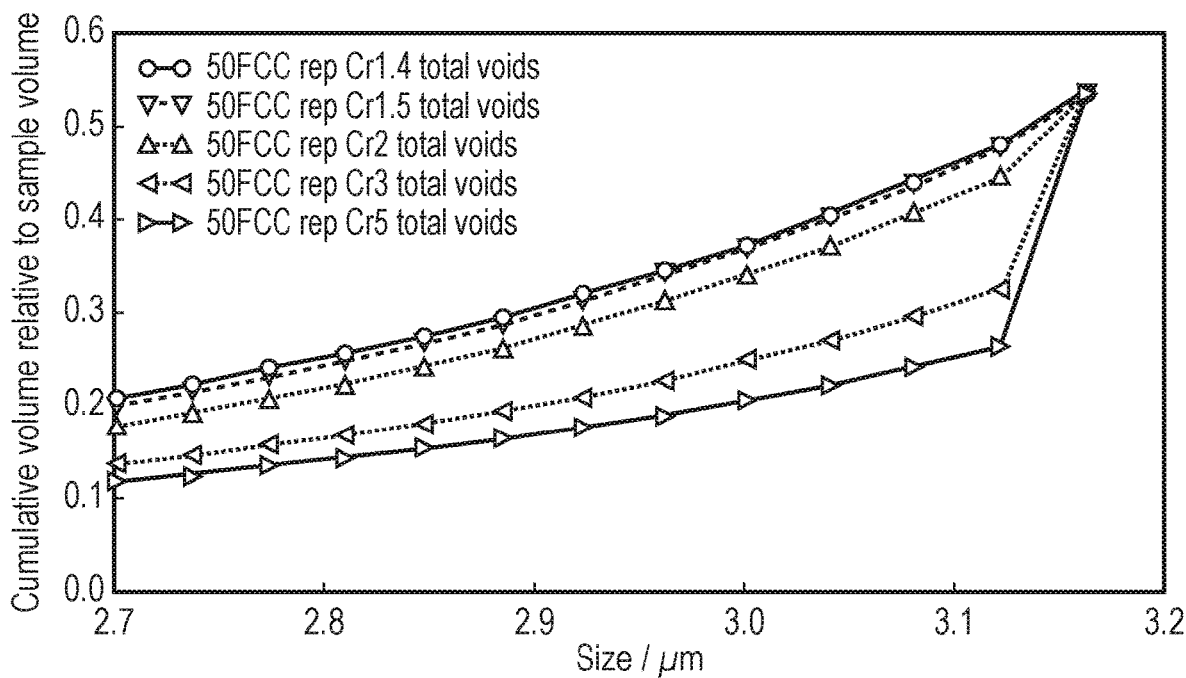
Figure 17:
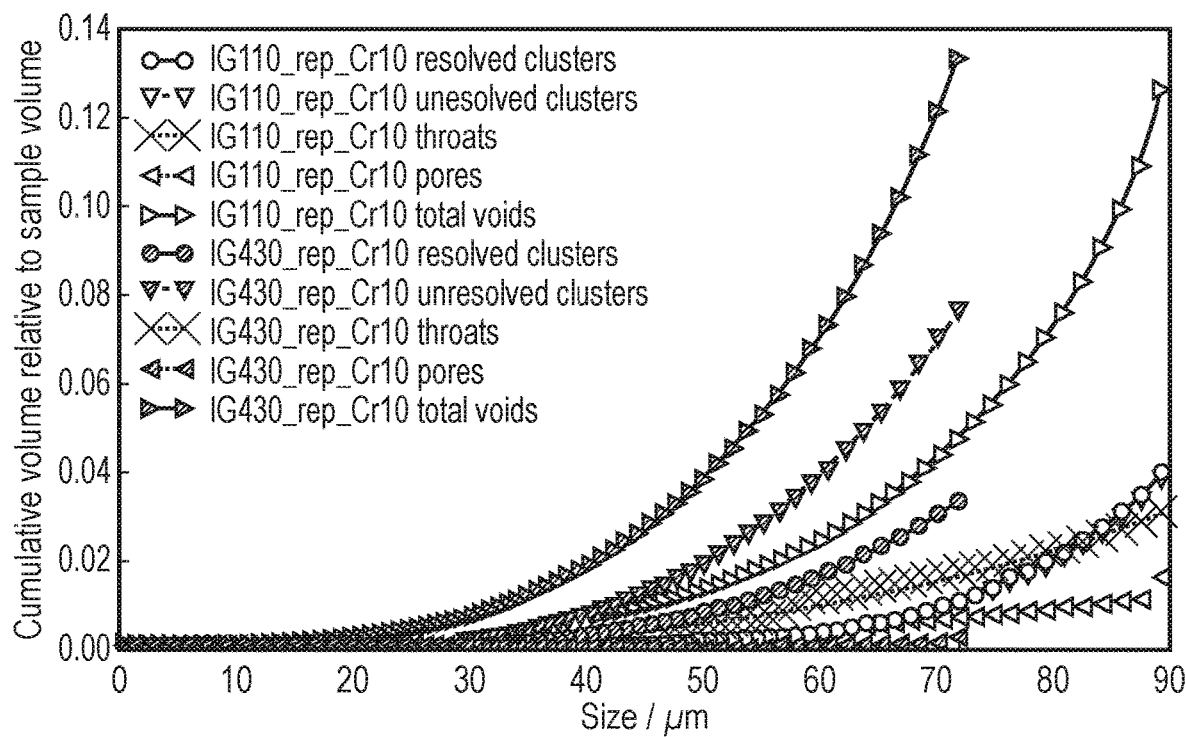
Figure 18:
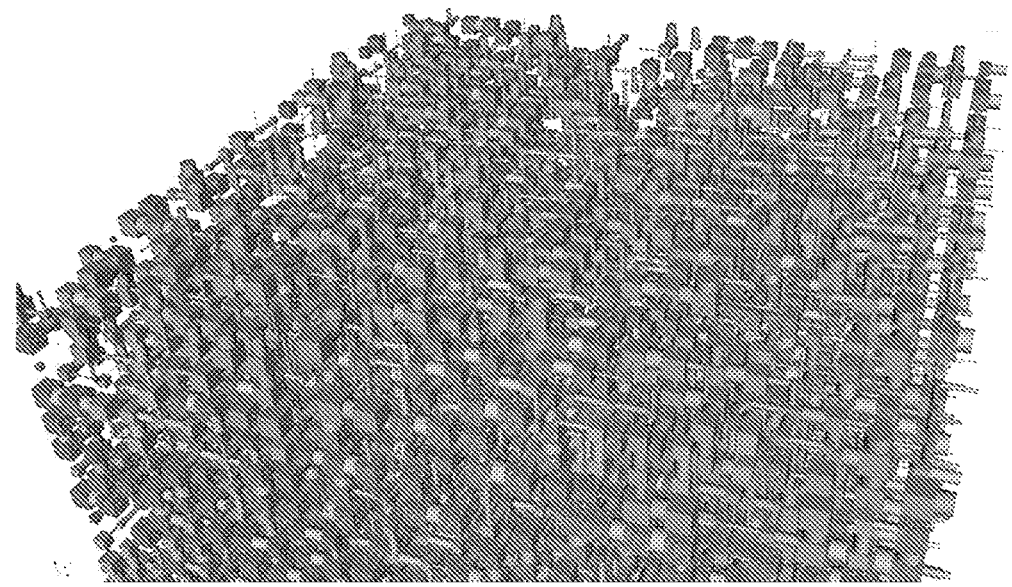
Figure 19:
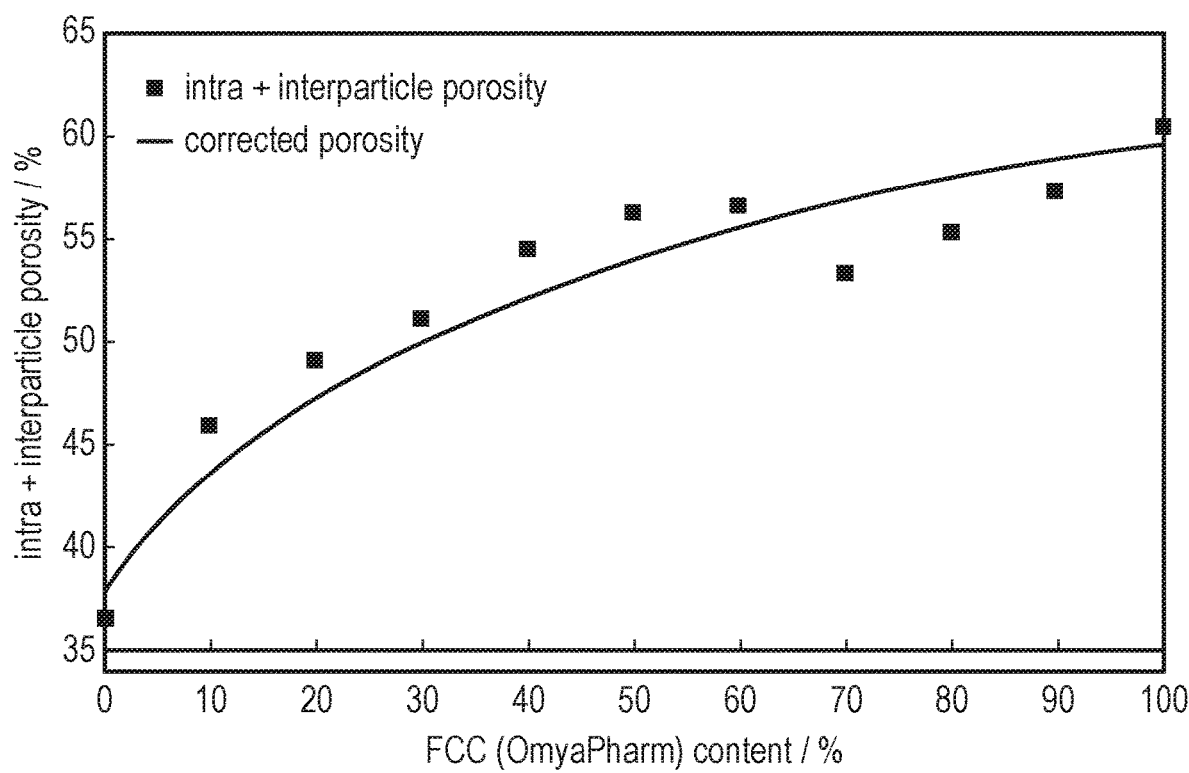
Figure 20:
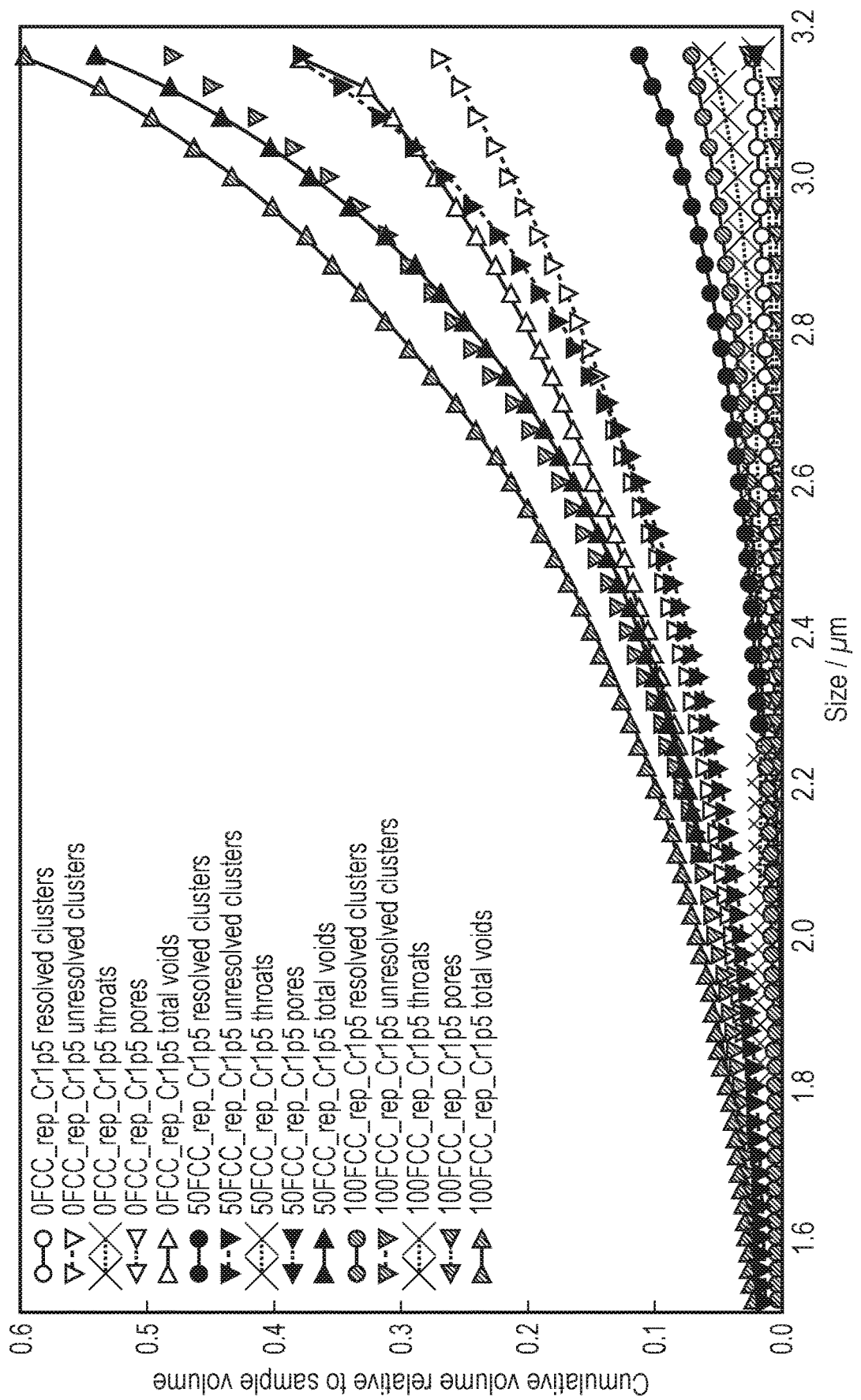
Figure 21:
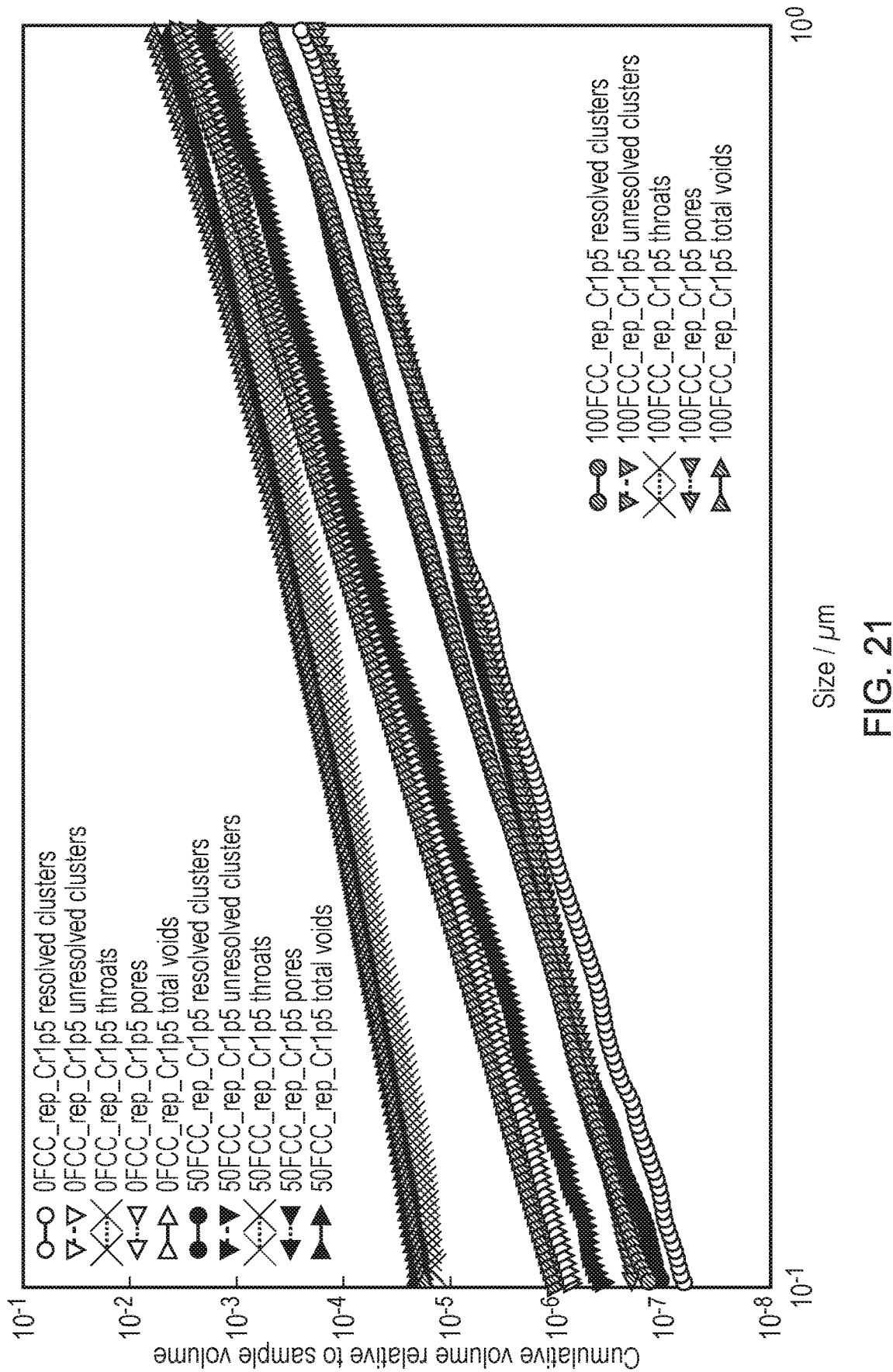
Figure 22:
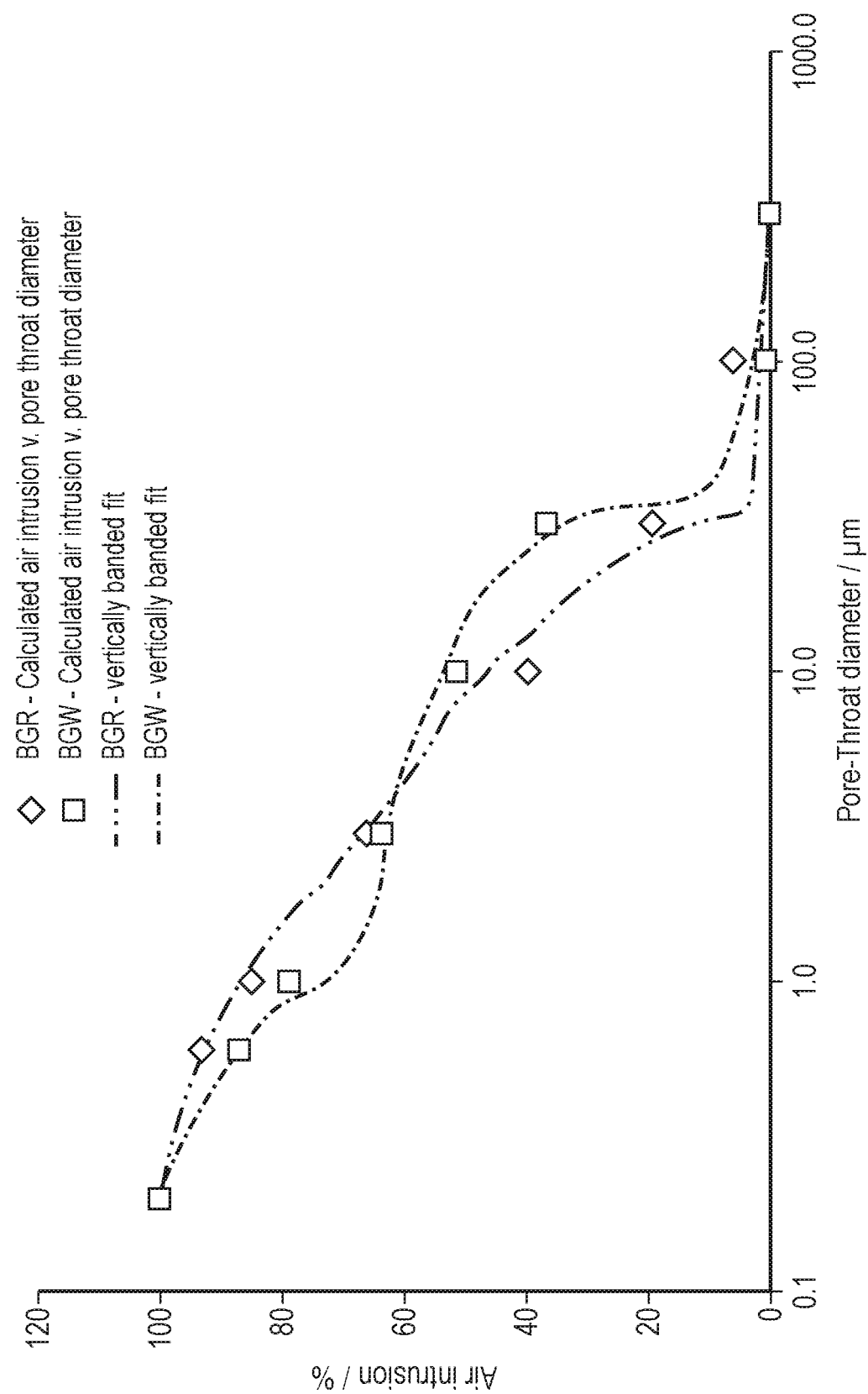
Figure 23A:
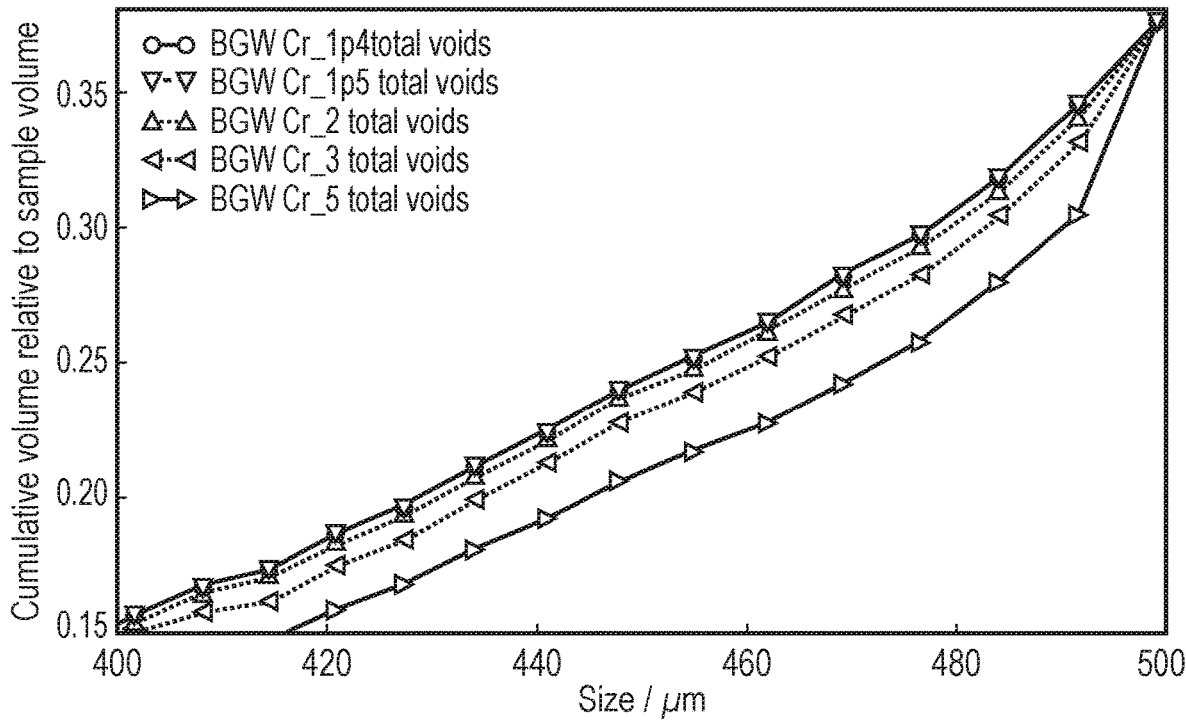
Figure 23B:
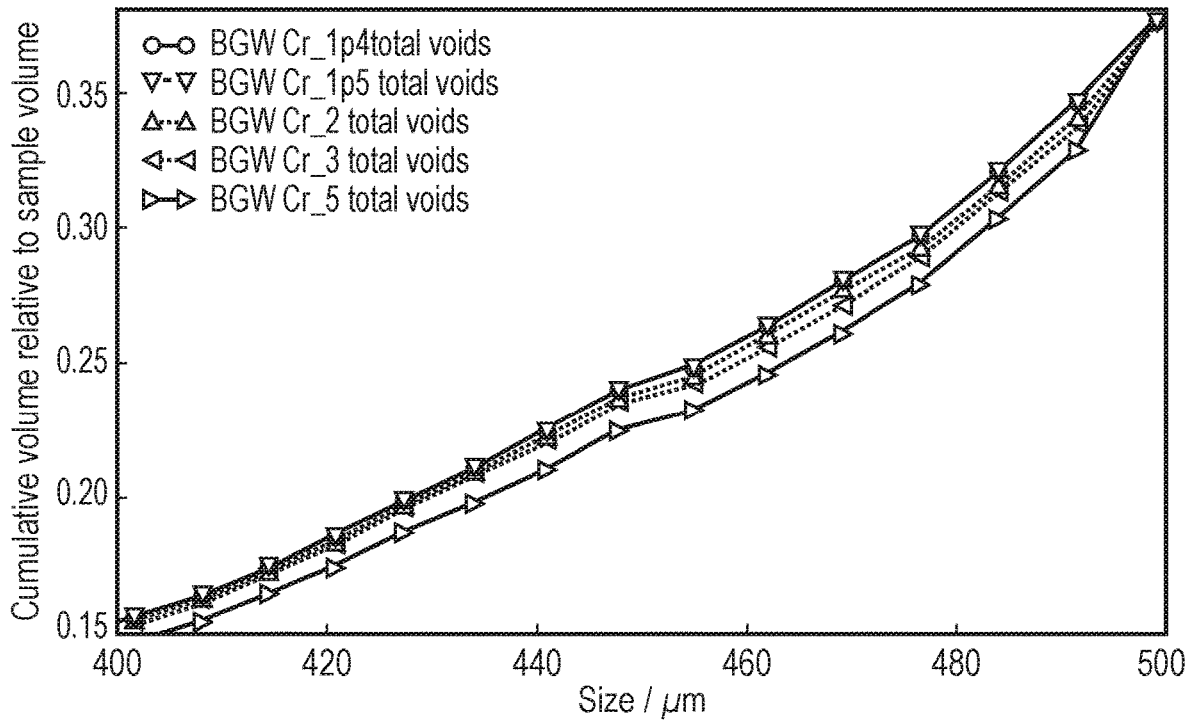
Figure 24A:
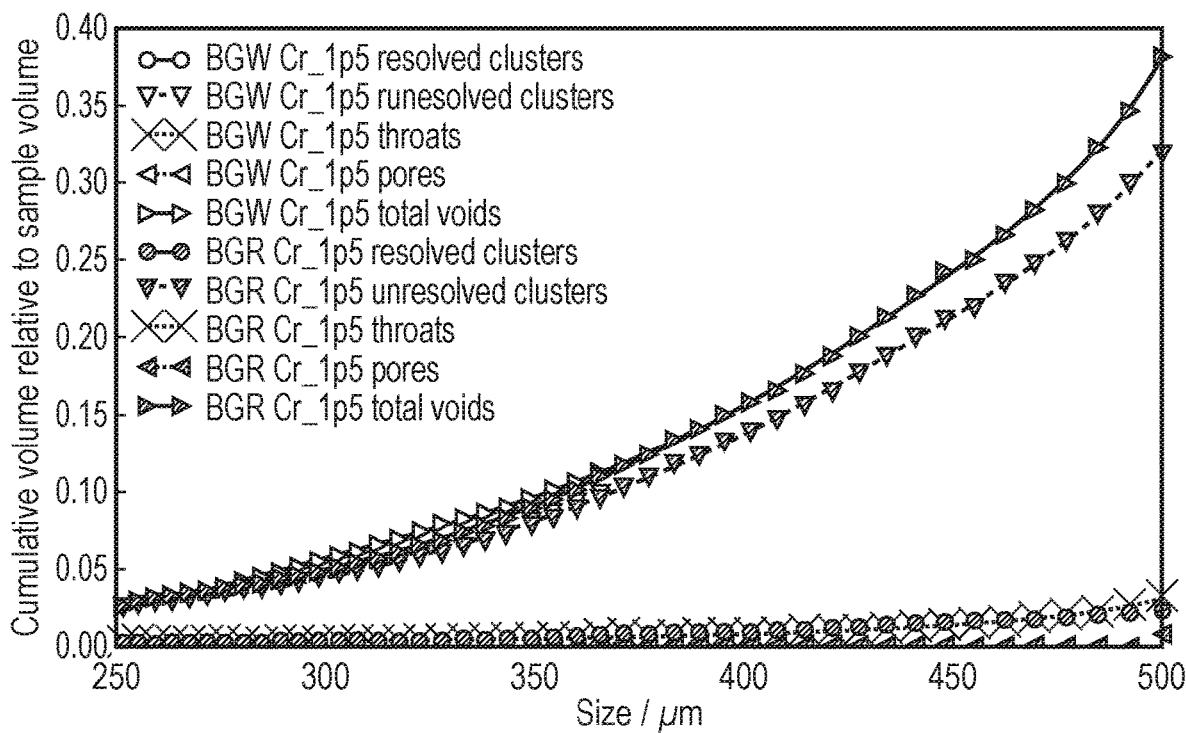
Figure 24B:
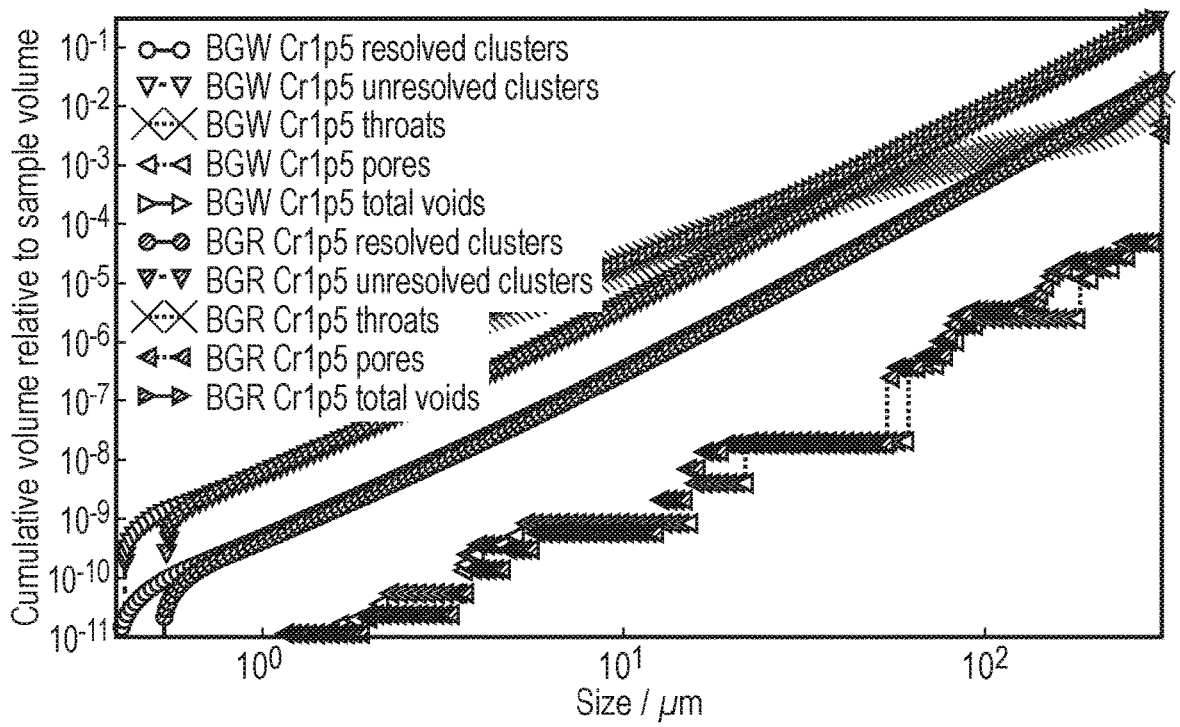

FIG. 11 shows the unit cell of a mixture of 50% FCC with GCC, showing clusters (rendered) for Cr=1.5, intruded up to 6.2% by volume with Hg (grey). Small red scale bar 3.33 μm;

FIG. 12 shows a detail of the top of the unit cell shown in FIG. 11, showing the very wide range of void sizes modelled. Some features are invisible even at this magnification;

FIG. 13 shows a calculation of cluster population for 50% FCC mixture with GCC, Cr=1.5;

FIG. 14 shows a calculation of cluster population for 50% FCC mixture with GCC, Cr=1.5–detail above 1 μm;

FIG. 15 shows explicit void size distributions for 50% FCC mixture with GCC, Cr=1.5;

FIG. 16 shows cumulative volumes of all voids within the representative unit cells for the 50% FCC mixture with GCC for Cr=1.4 to 5. Shown with linear axes for voids larger than 2.7 μm;

FIG. 17 shows analysis of void types within the representative unit cells of nuclear graphites IG-110 and IG-430, with Cr=10;

FIG. 18 is a detail of representative unit cell of IG-110, with Cr=10, intruded to 8.1% by volume with mercury (grey). Small scale bar top right is 137 μm;

FIG. 19 shows removal of packing artefacts from FCC/GCC mixtures porosities;

FIG. 20 shows all void types, with Cr=1.5, above 1.5 μm within the 0, 50 and 100% FCC samples;

FIG. 21 shows all void types, with Cr=1.5, with logarithmic axes covering the size range of 0.1 to 1 μm for the 0%, 50% and 100% FCC samples;

FIG. 22 shows botanic garden soil water retention curves expressed as air intrusion versus pore-throat diameter;

FIGS. 23a and 23b show botanic garden soil cluster ratio comparison, FIG. 23a showing wettable and 23b showing repellent types; and FIG. 24 is a comparison of all void types for Botanic Garden wettable and repellent soil, FIG. 24a illustrating on linear axes, above 250 μm, and FIG. 24b illustrating, on logarithmic axes, the entire size range.

INTRODUCTION

An unavoidable first step in modelling mercury porosimetry or water retention is to relate the pressure applied to the mercury, or the suction applied to the water saturated sample, to the sizes of the features intruded at that pressure. Traditionally, it is assumed that void features exposed to the non-wetting fluid (mercury displacing air or nominal vacuum, or air displacing water) are cylindrical, with diameter d. Then the features intruded at an applied pressure $P_{app}$ are calculated by the Laplace equation:

$$d^{expsd} \geq \frac{-4\gamma \cos\theta}{P_{app}} \quad (1)$$

The superscript 'expsd' is a reminder that only those features exposed to the advancing non-wetting fluid front will be intruded by the non-wetting fluid. The commonly accepted value of 140° is used herein for the contact angle θ of mercury intruding sandstone against residual air, and 0.48 Nm$^{-1}$ for the surface tension γ, whereupon the numerator of equation (1) becomes 1.47 Nm$^{-1}$. The well known uncertainties in these parameters [1] are important but nevertheless more minor than the fallacies addressed herein.

The traditional interpretation of percolation characteristics is to convert the differential pressure (i.e. applied pressure or suction) of the non-wetting fluid to pore-throat diameter via equation 1, and assume that the first derivative, i.e. slope, at a particular size is proportional to the number of features at that size. The first error is that the slope is clearly proportional to the volume of pore throats at that size, not their number. The second is that for the use of equation 1 to be valid, all features must be fully exposed to the non-wetting fluid and all must be cylindrical—i.e. the porosity of the sample must comprise a bundle of capillary tubes. Such an approximation is shown in FIG. 1 for the boxcar void size distribution described below. In many approaches, the capillary tubes are sinuous, with their degree of sinuosity being quantified as tortuosity.

Interpretation by use of the first derivative is in fact cryptic inverse modelling. Its enduring popularity arises because, unlike true stochastic inverse modelling, it yields a single void size distribution. Despite the fundamental error within this approach, it is in regular use for the interpretation of mercury intrusion of porous materials, the water retention of soil, and the porometry of filters and membranes. Sometimes the porosity of the sample is represented by a single tube—the effective hydraulic radius approximation. Soil water retention characteristics are also often interpreted by use of the Van Genuchten equation, which imposes smoothness and asymptotes onto often wayward experimental results as illustrated in FIG. 7, but which then results in non-orthogonal fitting parameters with no direct structural significance.

PoreXpert® is a void network simulation software which has been developed by the current authors and former co-workers, and made commercially available. It is an inverse modelling package which constructs three-dimensional void networks with percolation characteristics and porosities closely matching experimentally measured values. Many properties of the porous materials can then be simulated. With its predecessor Pore-Cor, it has been used in previous studies to model the porous network and pore level properties of various materials, such as sandstones, soil, catalysts, paper coatings, filters and nuclear graphite [2-5]. As described herein, we firstly use PoreXpert to demonstrate the first derivative fallacy, and then describe an improved method of characterising void types, while recognising those that cannot be fully resolved. In order to test the robustness of the approach, we apply it to three different porous systems of current research interest, all of which present major challenges to the investigator.

Materials and Experimental Characterisation

Nuclear Graphite

Samples of IG-110 and IG-430 graphite, also referred to as IG-11 and IG-43, were supplied by Toyo Tanso Ltd., Japan. IG-110 is a fine-grained, isotropic graphite which exhibits high thermal durability and strength, currently utilised in the Japanese High Temperature Test Reactor (HTTR) [6] and the Chinese High Temperature Reactor-Pebble bed Modules (HTR-10) [7]. IG-430 is a comparable graphite, developed to display higher density, strength, and thermal conductivity when compared with IG-110. Improved physical characteristics make it a suitable candidate for use in Generation-IV nuclear reactors. Table 1 shows some of the properties of the materials as listed by the manufacturers.

Figure 3:
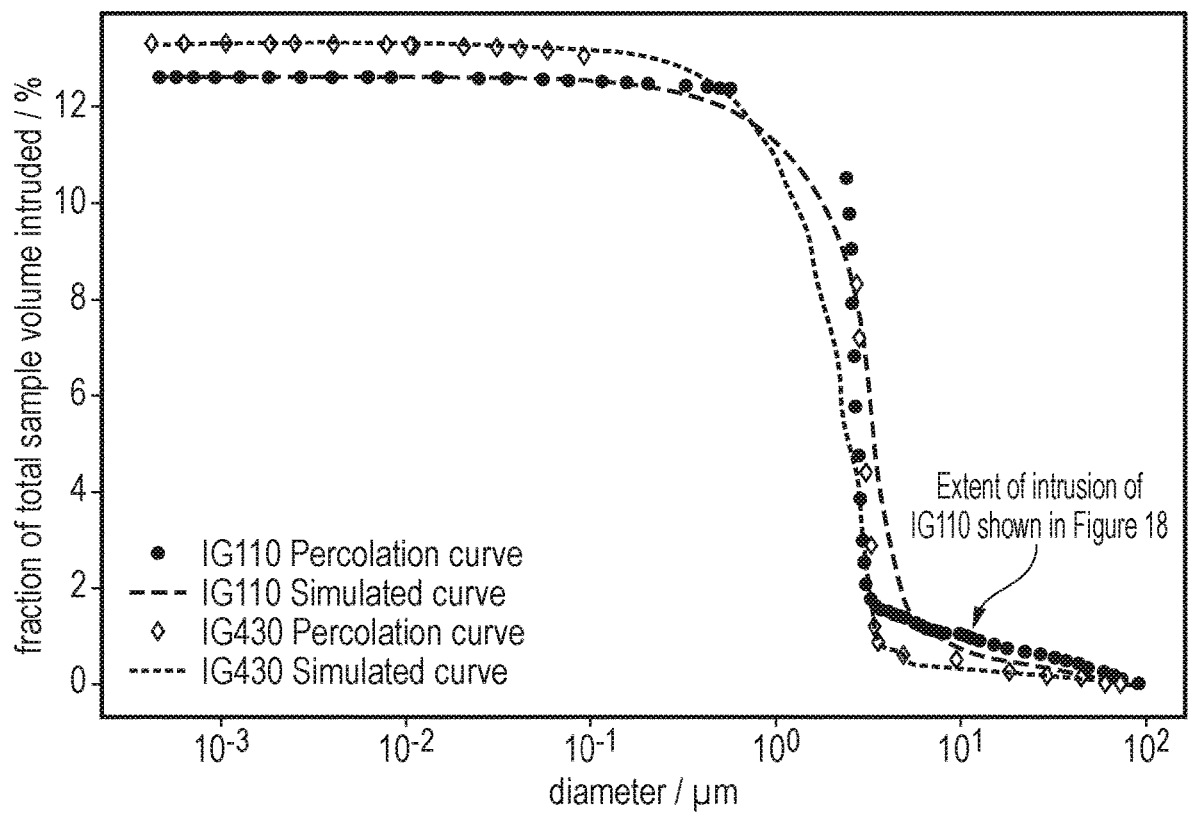
FIG. 3 shows mercury intrusion results and GCMC for nuclear graphites combined to give an overall percolation characteristic at high and low pore sizes respectively.

In the arrangement described in reference [8], the samples are characterised by pycnometry, Table 2, and electron microscopy, FIG. 2. In the same reference, it is described how for graphite, mercury intrusion gives very unreliable estimates of $d^{expsd}$, equation 1, in the highest pressure, lowest size range. Therefore Grand Canonical Monte Carlo interpretations of gas adsorption were used to construct the intrusion characteristic of the smallest voids, using the simulation software supplied and validated by the BEL-SORP instrument manufacturers, MicrotracBEL, Japan [9]. Such an intrusion characteristic was assumed equal to the cumulative pore volume distribution derived from the GCMC simulation, based on the correct assumption that all voids are accessible by the gas, so the shielding considerations discussed below do not apply. The asymptote of the constructed intrusion characteristic at highest pressure was set according to the helium accessible porosity, expressed in Table 2 as open pore volume, measured with a Thermo Fisher Pycnomatic pycnometer. The sample envelope volumes were measured with a Micromeritics GeoPyc pycnometer, and the results combined, with the known graphite crystal density, to give the closed pore volumes shown in Table 2. The constructed combined percolation characteristics are shown in FIG. 3.

TABLE 1

Manufacturer's characterisation of the graphite types

| Grade | Coke | Bulk density/ gcm$^{-3}$ | Coke particle size/μm | Tensile strength/ MPa | Young's modulus/ GPa | Thermal conductivity/ Wm$^{-1}$K$^{-1}$ |
|---|---|---|---|---|---|---|
| IG-110 | Petrol | 1.77 | 10 | 25 | 9.8 | 120 |
| IG-430 | Pitch | 1.82 | 10 | 37 | 10.8 | 140 |

TABLE 2

IG-110 and IG-430 nuclear graphite densities derived from powder and helium pycnometry, and porosities derived from pycnometry and mercury porosimetry, showing instrumental relative standard deviations (RSDs). The average envelope density has been measured by powder pycnometry and average skeletal density by helium pycnometry.

| Sample | Average skeletal density/ g cm$^{-3}$ | Instrument RSD/% | Bulk Density/ g cm$^{-3}$ | Instrument RSD/% | Open pore volume $\varphi_{OPV}$/% | Closed pore volume $\varphi_{CPV}$/% | Calculated total porosity $\varphi_{tot}$/% | Hg derived total porosity $\varphi_{Hg}$/% |
|---|---|---|---|---|---|---|---|---|
| IG-110 | 2.06 | 0.04 | 1.79 | 0.19 | 12.61 | 7.75 | 20.36 | 24.31 |
| IG-430 | 2.10 | 0.08 | 1.81 | 0.22 | 13.31 | 6.31 | 19.62 | 21.07 |

Minerals

Figure 4:
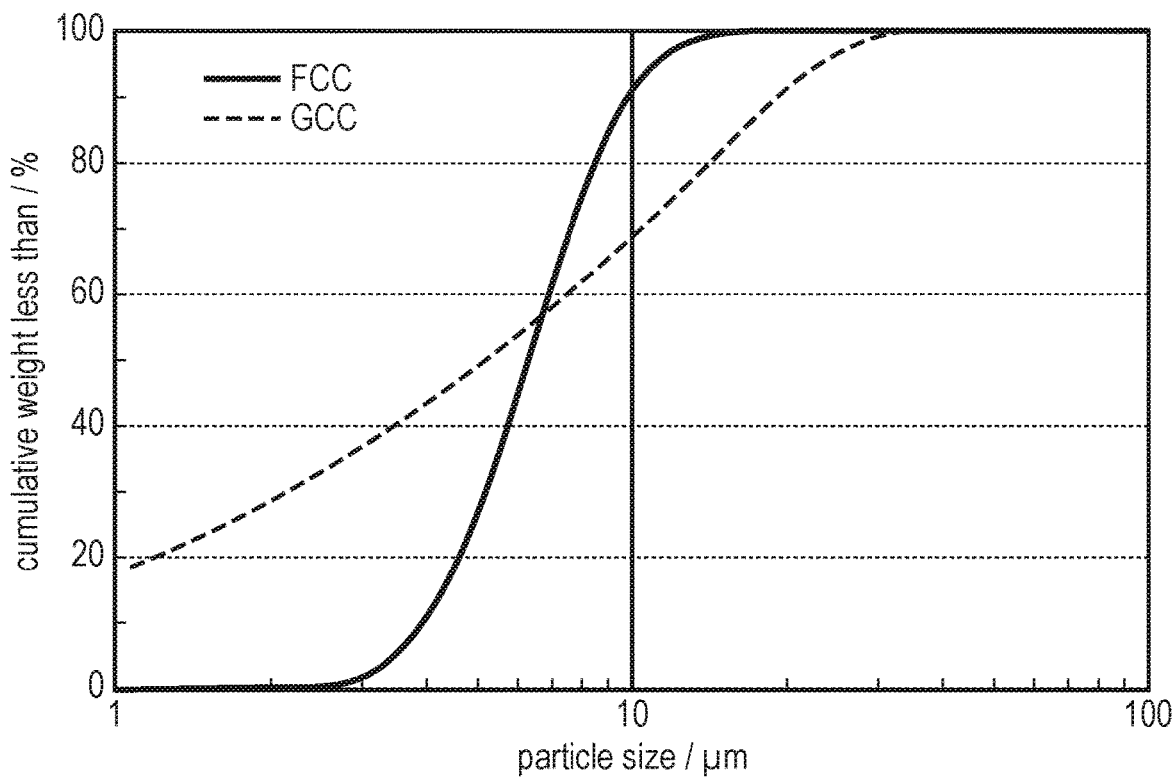
FIG. 4 illustrates mineral particle size distributions.

Functionalised calcium carbonate, or FCC, is produced by etching calcium carbonate particles and re-precipitating a modified surface structure with in-situ or externally supplied $CO_2$ in the form of carbonic acid [10-12]. Variations in the etching process produce a range of morphologies with recrystallised surfaces, consisting of incorporated hydroxyapatite (HAP) in the case of phosphoric acid, which are discretely separable dual porous systems with inter- and intra-particle porosity. FCCs are pharmaceutical grade analogues of MCCs (modified calcium carbonates), the latter being designed for the paper industry, particularly for coatings designed for ink-jet printing [10]. The type of FCC used in this work was OmyaPharm (2760/2), with a particle size distribution measured using a Malvern Master Sizer 2000 as shown in FIG. 4. The morphology of the FCC was determined by scanning electron microscopy, FIG. 5.

Non-porous ground calcium carbonate (GCC), OmyaCarb 5, was also provided by Omya International AG (Oftringen, Switzerland). It is an Italian dry ground calcium carbonate prepared with a small amount of dry grinding aid. Its particle size distribution is shown in FIG. 4, where is can be seen that its particle size distribution is wider than for FCC, but with the same weight-defined median value.

Mercury intrusion curves of the series of mixtures of OmyaPharm with GCC are shown in FIG. 6 (a). Their truncation, FIG. 6 (b), is justified below.

Soil

The soil used in this work undergoes natural transitions between being hydrophilic or hydrophobic to ambient water. The sample is part of a much wider study of hydrophobicity in soils from nano- to field scale, currently being completed. It was randomly sourced from the National Botanic Garden of Wales, Carmarthenshire, at a depth of 5 to 10 cm.

Soil was collected once when wettable and once when water repellent, with the wettability at the time of collection being determined by the water drop penetration time test (10 drops of 50 μL distilled water). Bulk density samples were taken from the site during soil collection using a 100 cm$^3$ core. The average bulk density for the site was determined from between 5 and 15 samples. Samples of both repellent and wettable soil were air-dried and then packed in 3.8 mm increments into rings 19 mm deep×22 mm diameter to bulk densities as close as possible to the site's field bulk density. The filled rings were then weighed and saturated before being exposed to a range of suctions in the range 1 to 1500 kPa in either pressure cells or on a tension table, corresponding to soil 'matric potentials' in the range −1 to −1500 kPa. At each of the matric potentials the gravimetric water content was determined, as shown in FIG. 7.

Soil roughness was obtained with Atomic Force Microscopy (AFM), using a Bruker BioScope Catalyst in Peak-Force Tapping mode and with Bruker MPP21200-10 probes. A total of eight regions per soil state were analysed, each region having an area of 25 μm$^2$. Nanoscope Analysis software calculated RMS roughness $R_q$ from topographical AFM data using the following relation:

$$R_q = \sqrt{\frac{\sum Z_i^2}{N''}} \qquad (2)$$

where $N''$ is the number of points in the scanned area and $Z_i$ is the vertical displacement of the $i^{th}$ data point from the mean data plane, FIG. 8.

Modelling and Interpretation

Inherent Problems

In using an inverse model to address the current weaknesses in interpretation, three inherent problems must be addressed, which result in the approaches described herein, whilst being imperfect, representing a substantial improvement over known techniques. The first is that percolation characteristics only give information on the volumes and connectivity of the void network, but not the shapes of the voids, nor their spacing apart, nor the precise directions of the connections. So in the inverse model we use the simplest assumptions, namely cubic 'pores' connected by cylindrical 'throats' in an entirely regular Cartesian framework, while bearing in mind that any properties derived from the network which primarily depend on these simplifying assumptions are likely to be incorrect.

The second inherent problem is that, because of computational limitations, we cannot generate a void network which has the same size as the sample itself. Instead we generate a 'unit cell' of the void network with periodic boundary conditions i.e. effectively connected to infinite replicates of itself in all directions. Too small a unit cell will give rise to artefacts due to false repetition of features within its replicates, whereas larger unit cells become ever more computationally intensive to generate and study—with computation time and memory typically increasing as $v^3$ or $v^4$ according to the operations carried out or properties simulated, where v is the number of nodes (pore positions) along each side of the Cartesian network.

The third inherent problem is that the inverse modelling, even with the simplifying assumptions, does not produce a unique void structure—there are an indeterminately large number of void networks which could produce the same percolation characteristics. To address this issue, we generate structures stochastically to produce a population which has definite bounds—one set of bounds being the range of sizes of the voids determined by the range of experimental pressure or suction via equation 1. There is also the possibility of short-range throat:throat size autocorrelations, which are dealt with by 'structure types'. In the present case, the structure type which best fits the experimental percolation characteristics of all three samples is 'vertically banded'—i.e. the correlations cause planar layers of similarly sized throats within each unit cell parallel to the direction of non-wetting phase intrusion. The model can optimise its fit to the experimental percolation characteristic by choosing a correlation level C within the range 0 (random) to 1 (fully correlated). Intermediate values (0<C<1) correspond to overlapping size distributions between the parallel layers. The closeness of fit is measured by normalising each axis (size and intrusion) to 100%, measuring the closest distance from each simulated point to the experiment curve using these normalised scales, and averaging them to give an average distance δ. The optimisation is then the minimisation of δ by varying the real and Boolean parameters described in the next section.

Ideally we would produce enough stochastic generations to form a population that is statistically representative of the entire population of possible structures. However, in practice there is a trade-off between this inherent problem and that of computational intensity—so we use v=30 for the boxcar function and calcium carbonate mixtures, corresponding to unit cells with up to 108000 void features. Due to the complexity of modelling absolute permeability and wettability, the subject of parallel studies, for the graphite samples v=25 and for the soil samples v=20, corresponding to unit cells with up to 62500 and 32000 void features, respectively. For all the simulations of real samples, we generate five stochastic generations. From these five, we select the structure which is statistically most central within the small multidimensional population of structures as being most representative of the void network of the experimental sample.

The First Derivative Fallacy

The first derivative fallacy is illustrated by using PoreXpert to forward model the percolation characteristic of a boxcar function of throat sizes over the size range 0.7 to 1422 μm, i.e. equal numbers of throats at each of N=500 sizes logarithmically distributed within this size range, and none outside the size range. The precise number at each size depends on v, and the connectivity w of the network arbitrarily set to an average of 3.366 throats per pore. In this case there is an average of 90.88 throats at each size. All 27000 pores were set to the largest size in the range, i.e. 1422 μm. The structures were generated to give an arbitrary porosity φ of 0.26. Generation of structures with C>0.7 was impossible, because the correct porosity could not be achieved due to the inefficient packing of the void features on the regular Cartesian grid.

FIG. 9 shows the results plotted in the form of mercury intrusion characteristics over the pressure range of 0.00103 to 2.1 MPa, corresponding to the stated throat size range via equation 1. It can be seen that the simulated intrusion curve shapes vary from a sigmoid curve for correlation value C=0.0 to an almost linear characteristic for C=0.7. The corresponding slopes of the curves, shown dashed, are mostly centred around the same logarithmic mean pressure of 0.047 MPa (corresponding to a void size of 31.5 μm), but have entirely different shapes, and would be erroneously interpreted as being caused by different distributions of void sizes. The structure which would be most correctly interpreted by taking its slope is that for the highest correlation level, C=0.7 (denoted by in FIG. 9). The almost linear intrusion curve has a nearly constant slope that implies the correct, boxcar void size distribution. This is because taking the slope of the intrusion curve implies voids in the form of a capillary bundle—in the present case, those covering the size range shown in FIG. 1. (In that Figure, φ<0.26 because of the inefficient packing of the features on a regularly spaced Cartesian grid.) The structure with C=0.7 most closely resembles a capillary bundle, because the throats are positioned in vertical bands mostly according to their size. However, it can be seen that with C=0.7 there is a step in the simulated intrusion curve at low pressures. This can be understood by examining the unit cell intruded to 15.7% by volume, FIG. 10. It can be seen that the mercury has at that pressure percolated from the exposed top surface of the unit cell into the layer connected by the larger throats, but has yet to percolate into those connected by smaller throats. The similarity of this structure to a capillary bundle cannot be seen in the figure, because the layered throats are masked by the large pores. Overall, the wide variation in the first derivatives of the intrusion curves, as shown in FIG. 9, all derived from the same void size distribution, underlines the invalidity of using the first derivative as a measure of void size distribution.

It might be hoped that having forward modelled the mercury intrusion characteristic from the void size distribution, one could then use PoreXpert to inverse model the resulting intrusion curves to retrieve the original void size distribution. However in this case that does not happen. The optimum values of the parameters are found using an amoeboid simplex moving within 5-dimensional parameter space, defined by the connectivity of the network, the skew and spread of the Euler throat size distribution, and C. A fifth parameter is termed 'pore skew' P and compensates for inefficient packing on the regularly spaced Cartesian grid by bulking up pores with less than the maximum size up to (but not above) the maximum size. High values of P produce a peak at the top of the void size distribution, which the new approach described here is then designed to eliminate. To minimise the peak, P is kept as low as possible by sloping its parameter space hyper-surface. There are also three additional step-function Boolean boundaries imposed—namely whether the porosity is achievable, whether the resulting network is fully connected, and that no void features overlap. Because of the effective coupling of the parameters (i.e. a change in one parameter can be compensated by a change in another to maintain convergence onto the experimental percolation characteristic), the parameter space is not populated in a predictable (e.g. Gaussian) manner. Also, the physical construction of the void networks cause the hyper-surfaces within the parameter space to be uneven, with false minima which necessitates Boltzmann annealing of the simplex [13]. So because of the complexity of the convergence, there are two additional quasi-Bayesian constraints imposed on the simplex. Firstly, it starts with a typical relationship between the sizes of neighbouring pores and throats as measured directly [14]. Secondly, it learns from previous modelling attempts, which are for actual samples, none of which contain throats with sizes following a boxcar function. It then heads towards what it regards is the most likely void size distribution, which is consequently not a boxcar function.

The Void Size Identification Fallacy

The second major fallacy in the interpretation of percolation characteristics is that the sizes of all voids can be unambiguously identified. We refer to the pressure at which a void would be expected to fill with non-wetting fluid or the suction at which it would be expected to drain of wetting fluid as the size intrusion pressure P size, since it depends only on the internal size of the void itself, not on the diameters of any throats connecting it to its neighbours within the void network. Every pore m within the network intrudes at a specific pressure or suction $P_{app}$ applied to the outside of the sample, approximated in the simulation as $P_{app}$ at the top surface only of the unit cell. The pressure at the pore-throat of a particular pore, $P_{pore-throat,m}$, could equal $P_{app}$ if the pore-throat is freely connected to the sample surface, or less than $P_{app}$ if the pore-throat is shielded from the surface. The shielding is more likely in a random network than in a correlated network, so that the shielding is a function of $1/C$, noting that there is an indefinite asymptote to the shielding function, namely $f(1/C) \to \geq 1$.

The inequality arises from the fact that even in a fully correlated network of a type such as vertically banded, there still may be some shielding when $C=1$, resulting in a shielding function greater than 1. Also, for other structure types, for example a spherical locus of large throats and their associated pores surrounded at increasing radii by spherical shell loci of throats of successively decreasing size, then there will still be significant shielding when $C=1$. The shielding can also vary as the intrusion proceeds, so is a function of the volume of non-wetting phase intruded $V_{P_{app}}^{intr}$ at an external applied pressure $P_{app}$. As an example, the step in the intrusion curve for the boxcar function for $C=0.7$, FIG. 9, is caused by high shielding for $V_{P_{app}}^{intr}<20\%$, and low shielding, i.e. $f(1/C) \approx 1$, for $V_{P_{app}}^{intr}>20\%$. In summary, $$P_{app} = f\left(\frac{1}{c}, V_{P_{app}}^{intr}\right) \cdot P_{pore-throat,m} \quad (3)$$

where the shielding function $$f\left(\frac{1}{c}, V_{P_{app}}^{intr}\right) \geq 1 \quad (4)$$

Since by definition the pore-throat must be smaller than the pore itself, then $P_{pore-throat,m} > P_{size,m}$. Due to this inequality and that in equation 4, the relationship between $P_{app}$ and $P_{size,m}$ cannot be determined analytically, and varies for each pore, depending on the size of the pore-throat and its connectivity to the sample surface. Correspondingly the size of void m cannot be determined from $P_{app}$ via equation 1.

Fortunately, in accordance with the invention, we are now in a position to apply further analyses to the data. The first is that we can forward model the percolation characteristic within a network generated by the inverse modelling of the same percolation characteristic. As $P_{app}$ is progressively increased during the simulation, we can record the local values $P_{intr,m}$ at which every void is intruded during the percolation process. We assume there is a value of the threshold 'cluster ratio' Cr, assumed constant for all m, such that $$Cr = \frac{P_{intr,m}}{P_{size,m}} \quad (5)$$

above which a pore m can be identified as a cluster of voids. FIG. 10 shows the unit cell for the boxcar distribution with Cr=2. Since in that unit cell all pores have been set to the maximum size, then via equation 1, all $P_{size,m}$ take a minimum value for all m, and so via eqn 5 nearly all pores are actually clusters. Pores which are not clusters which have filled with mercury can be seen at the top of the unit cell, as can be seen in the enlarged detail.

This approach can be most readily understood when applied to a real sample. As an example, we use the 50% FCC mixture with GCC, for which the intrusion curve is shown in FIG. 6 (b). FIGS. 11 and 12 show the representative unit cell for Cr=1.5. FIGS. 13 and 14 show histograms of the total volumes of void features at each n of the N=500 feature sizes within the representative unit cell of the inverse model of the mercury intrusion of the 50% FCC mixture. The total volumes at each size are shown for throats (▲), pores (▼), and all clusters (●), with the distributions designated as ⊖, Π and $X_{all}$, respectively, with the total distribution $T=\ominus+\Pi+X_{all}$. The distribution of all clusters has an anomalously high value at the maximum size $X^0=X_{all}$ (n=N), which we attribute to unresolved clusters. To calculate the volume of these unresolved clusters, a subset $E=X_{all}$ ($0.9N<n<N-1$) (⌘) is extrapolated with a second order polynomial in log space (▬) to a point at the maximum size (■) which becomes $X_{max}=X_{all}(n=N)$. The difference in volume between the extrapolated point and the anomalous point is then taken to be the volume of unresolved clusters, $V_{undiff}^{tot}=X^0-X_{max}$. These are assumed to follow the same size distribution as the resolved clusters, $X_{undiff}=c \cdot X_{diff}$ where the constant c is set by the stated requirement that $\Sigma X_{undiff}=V_{undiff}^{tot}$. The resulting resolved distributions are shown in FIG. 15.

A second criterion follows from the observation that the void size and volume distribution is a sampling of the total distribution of the sample between the minimum and maximum applied mercury pressure or tension, via equation 1, or over a wider size range if two or more experimental techniques are combined. Although there may be a peak in the distribution at highest pressure or suction, since the size range is arbitrary with respect to the actual void size range within the sample, such a peak is sufficiently unlikely to be discounted. Consequently the total void size distribution T should be continuous and not have a peak at highest size. Intuitively, the cluster ratio Cr should be as large as possible while satisfying this criterion, since the greater the discrepancy between $P_{app,m}$ and $P_{size,m}$, the greater the probability that the size is a cluster.

It can be seen in FIG. 16 that for the 50% FCC mixture there are definite discontinuities in the distributions T for cluster ratios Cr of 5, 3 and 2, but not for Cr=1.5. It can also be seen that there is a negligible difference between T for Cr=1.4 and 1.5. Hence Cr=1.5 was chosen, as used in the unit cell and graphs of FIGS. 11 to 15.

Application to Experimental Samples

Nuclear Graphite

The first question we pose is whether the new pore analysis methodology is useful in elucidating the difference in void structure between the nuclear graphites IG-110 and IG-430. The difference between the materials is that IG-430 was produced by using pitch to produce coke for graphitisation, rather than petrol, giving the desired increase in tensile strength, Table 1. Examination of the materials by electron microscopy shows no evident difference, FIG. 2. However, subjecting them to mercury intrusion does show that IG-110 starts to intrude at a lower pressure than IG-430, and that there is significantly greater intrusion corresponding to pore-throat diameters $d^{expsd}$ in the range 3 to 100 μm, FIG. 3. FIG. 9 underlined the danger of misinterpreting the points of inflexion of a mercury intrusion curve. However, as can be seen in FIG. 3, in which the intrusion proceeds from right to left, the 3 to 100 μm range occurs before the point of inflexion (i.e. at lower $P_{app}$ and higher $d^{expsd}$). So in this case, use of the first derivative approximation, implying larger voids in the 3 to 100 µm range for IG-110, should not be too bad an assumption if restricted to that size range.

The intrusion curves were modelled as described previously, and the simulated intrusion curves corresponding to the representative unit cells are shown in FIG. 3. A very useful feature of the inverse model is that it can intelligently bridge gaps in experimental percolation data. The lack of experimental data either side of 1 µm in FIG. 3 simply results in greater differences between stochastic generations, since if the percolation characteristic is not defined, the simulated curve can vary freely in the undefined region without affecting δ.

It can be seen that the combined percolation characteristics cover more than 5 orders of magnitude of size. Convergence onto intrusion characteristics over such a wide size range is demanding, to the extent that although the stochastic generation chosen for IG-430 is representative (with δ=0.8%), that for IG-110 was selected only by minimum distance (δ=1.7%). The simulations do pick up the difference in intrusion at low $P_{app}$, high $d^{expsd}$, although are not so close around the point of inflexion. The correlation levels of the resulting vertically banded structures are low (C=0.04 and 0.06 for IG-110 and IG-430 respectively), demonstrating very homogeneous, random arrangements of voids, as designed by the manufacturers.

For these samples, the cluster ratio Cr is found to be 10, following the procedure illustrated in FIG. 16. FIG. 18 shows intrusion by mercury to a pressure of 0.135 MPa causing intrusion to 8.12% by volume, as arrowed in FIG. 3. It can be seen that at this pressure, intrusion has occurred exclusively in voids that are not clusters, i.e. not shown rendered in FIG. 18. Analysis of the void types, FIG. 17, reveals that whereas the pore-throat size distribution for the two samples are almost identical (X), IG-110 contains a higher volume of pores (≪) extending to larger sizes than IG-430 (≪).

In this case there is no fully independent experimental data to support this void analysis. The void analysis follows that expected from the first derivative approximation applied to the low $P_{app}$/high $d^{expsd}$ section of the intrusion curve, and is compatible with the higher tensile strength of IG-430, Table 1. However, the difference in void structure is too subtle either to show up on the electron micrographs, FIG. 2, or as a difference in open pore volume, Table 2.

Calcium Carbonate Mixtures

Secondly we apply the new methodology to all the mixtures of FCC with GCC. It can be seen in FIG. 6 that there are two steps in their intrusion curves—one at around 2 µm, and the other around 0.3 µm, with the latter only being apparent for the higher ratios of FCC. Reference to FIG. 4(a) shows that the main steps at around 2 µm are indeed due to mercury intruding the inter-particle space before intruding the intra-particle voidage, i.e. the dual distributions are indeed discretely separable. This is confirmed by the fact that the 100% OmyaCarb 5 intrusion curve has the step at 2 µm, with no further intrusion at higher pressure (lower diameter). In order to model the intra-particle microporosity only, it is therefore valid to truncate the intrusion curves, and model only the sections representing intrusion of the intra-particle microporosity, FIG. 6 (b). Such an approach has previously been used to separate flow and capillarity effects for the control of inkjet performance on paper coatings [10].

The standard reason to pack an active material with an inert one is in the design of packed bed reactors, where the active component of the mixture is a catalyst. Under these circumstances, the usual requirement is to keep the catalyst particles apart, suspended in an inert matrix which nevertheless allows flow of a fluid past the particles. If the active material is porous, this approach can be used to separate the inter- and intra-particle diffusion effects [11]. Consequently there are many studies of the likelihood of particles touching each other, for example by Bezdek and Reid [15].

In this present study, we ask the converse question, namely whether by packing FCC particles together we can create additional microporosity where the particles touch each other. Such a postulate would be supported by the slight step in the intrusion curves around 0.3 µm, FIG. 6 (b), which increases with increasing FCC component. Alternatively, the FCC particles might have some particular features in their microporosity around 0.3 µm. The final alternative possibility is that in the context of FIG. 9, the steps are merely the results of percolation through the interconnected void networks of the individual FCC particles, a phenomenon which becomes increasingly apparent as the percentage of FCC in the mixture increases.

In applying the methodology to experimental samples, one first has to bear in mind the non-uniqueness of inverse modelling structures, and the ease with which the ameoboid simplex can stochastically explore the wrong regions of the complex parameter space—or, in the vernacular, 'slight garbage into the model, major garbage out'. So the first requirement is to ensure that the experimental data input to the model is as free as possible from artefacts. In this case, it is clear that the intra-plus inter-particles porosities derived from the mercury intrusion curves should follow a smooth monotonic curve. In fact they do not, because of different particle packing efficiencies across the series of mixtures, FIG. 19. On adding GCC, i.e. moving from right to left on the graph, the GCC initially fills in the interparticle pores, giving lower porosity than expected, but at higher GCC (lower FCC) displaces the FCC particles giving a higher than expected porosity. An analogous effect can also be observed in the suspension rheology of such mixtures [16]. These packing phenomena are not a feature that we wish to model, so they need to be eliminated by smoothing the sample porosities, as shown in FIG. 19.

Following that, five stochastic simulations were carried out for each sample, and the representative structures chosen as described earlier. The example shown in FIG. 6 (b) has a closeness of fit δ=1.1%, and can be seen to fit the slight step in the intrusion curve around 0.3 µm. Overall, for all the representative structures, δ=1.3%±0.5% standard deviation.

We then carry out a full analysis of all the void types across the samples, illustrated for 0, 50 and 100% FCC above 1.5 µm in FIG. 20. Even when the axis ranges are widened by the use of logarithmic axes, it can be seen in FIG. 21 that there is no unexpected maximum in voidage at around 0.3 µm. So the steps are explained by the third of the postulates above, namely percolation through the interconnected void networks of the individual FCC particles. FIG. 21 also shows that as size decreases, nearly all the total voidage (▶) becomes made up of pore-throats (X).

Figure 5B:
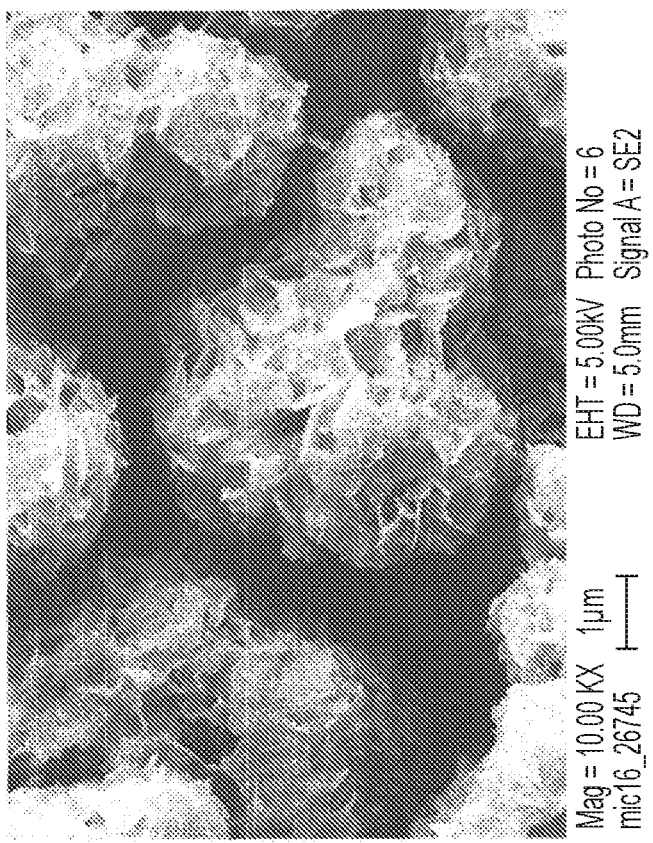
FIGS. 5a and 5b are scanning electron micrographs of the OmyaPharm FCC sample (FIG. 5b being showing part of FIG. 5a in greater detail)
Figure 5A:
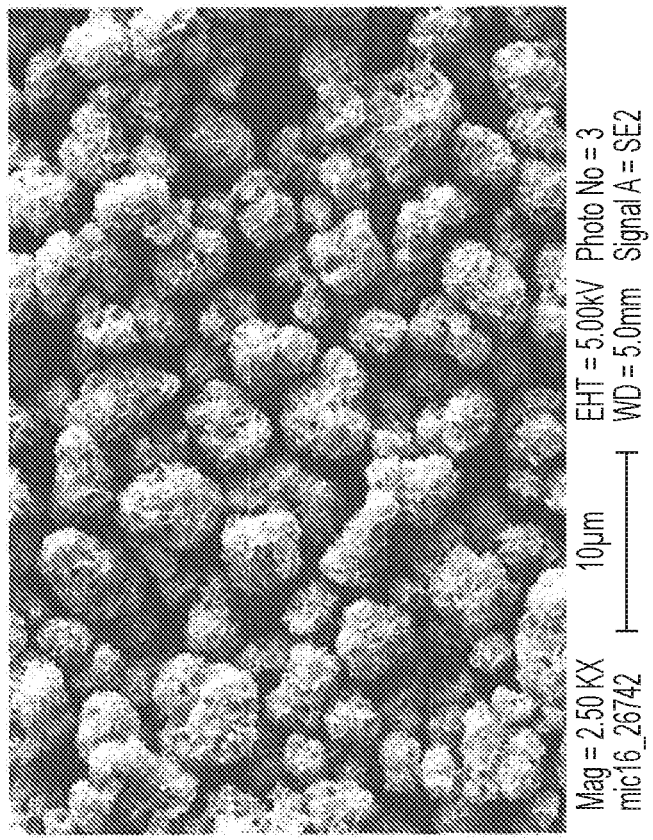

Both these observations are corroborated by the micrographs, FIG. 5, which show no evidence of structure that would give rise to a local maximum in voidage around 0.3 µm (a third of the scale bar of FIG. 5(b)), and which show that at that size, because of the laminar structure of the voidage, all the voidage comprises what are effectively pore-throats. Neither conclusion could be drawn for the traditional, first derivative, interpretation of the intrusion curves.

Hydrophobic Soil

In the case of soil, we ask whether the differences in water retention curves for Botanic Gardens wettable (BGW) and repellent (BGR) soil shown in FIG. 7 represent a change in structure. There is a slight difference in porosity $\phi$ between the two samples, from $\phi=0.380$ for wettable soil to 0.376 for repellent soil. This is likely to be due to the re-packing of the sample prior to the water retention experiment, but there could be a contribution from the change in wettability—so in this case has not been corrected out. In order to model the curves, they must be plotted as percolation—i.e. intrusion of air, and convert the tensions to pore-throat sizes via equation 1, assuming water is entirely wetting ($\theta=0$) for soil in air, FIG. 22.

FIG. 23 shows that, as for the mineral samples, a cluster ratio of 1.5 is appropriate for both the wettable and hydrophobic soil samples. FIG. 24 shows that the structure of the soil does not change significantly during a transition from a hydrophilic (shown blue) to hydrophobic (red) state, and that when the whole size range is represented by using logarithmic scales, the differences become even more insignificant compared to the major difference in wettability of the two samples, which is the subject of a parallel study [17].

The absence of a clear structural difference in the two wettability states is supported at core scale by the negligible change in porosity, although as explained above that cannot be deconvoluted from packing efficiency. At nanometre scale, the lack of structural difference is supported by an absence of topographical roughness as measured by AFM, which shows no significant difference between the two states (t-test P value=0.218), FIG. 8.

Conclusions

With the aid of a mathematically generated void network with a simple boxcar pore-throat size distribution, we have demonstrated that changes in the short-range pore-throat size auto-correlation factor C can cause widely different simulated intrusion curves. In this context, it is clear that the traditional first-derivative interpretation of percolation characteristics measured by mercury intrusion, and analogously by porometry or water retention, can lead to false suppositions. We have identified an improved method of analysis which, with the aid of stochastic inverse modelling, allows a more realistic estimate of the sizes of voids within a porous material, and identifies those voids within the estimate that are actually void clusters.

For the case of nuclear graphite, the improved method demonstrates that the traditional first-derivative approach is reasonable for the interpretation of changes in low volume intrusion before the point of inflexion. However, for both microporous calcium carbonate and transiently hydrophobic soil, the method shows that the traditional interpretation of differences in percolation characteristics at higher intrusion volumes at or beyond any point of inflexion leads to false assumptions. The traditional approach interprets the changes as alterations in the void sizes, since that is its only output parameter, whereas in fact the changes in percolation can be due to much more subtle effects, such as variability in C.

Independent experimental evidence has been presented that supports, but does not prove, the invention. Direct experimental confirmation could come from X-ray CT scanning, but the best resolution is typically 3 μm, whereas a resolution of 0.1 μm would be required to support the new findings. Focused ion beam ablation (FIB) could provide evidence for nuclear graphite, if ablation occurred over sufficient sample area precisely located in an electron microscope, and that will be the subject of a future study.

The invention has been illustrated for three widely different samples, but could be applied to any porous material for which the capillary bundle approximation of porous structure is inappropriate. It is therefore applicable to nearly all naturally occurring meso- and macroporous materials, and to nano-porous materials other than, for example, track etch membranes and zeolites.

REFERENCES

[1] J. VanBrakel, S. Modry, M. Svata, Mercury Porosimetry—State of the Art, Powder Technology 29 (1) (1981) 1-12. doi:{10.1016/0032-5910(81) 85001-2}.

[2] P. Bodurtha, G. P. Matthews, J. P. Kettle, I. M. Roy, Influence of anisotropy on the dynamic wetting and permeation of paper coatings, Journal of Colloid and Interface Science 283 (2005) 171-189.

[3] C. M. Gribble, G. P. Matthews, G. M. Laudone, A. Turner, C. J. Ridgway, J. Schoelkopf, P. A. C. Gane, Porometry, porosimetry, image analysis and void network modelling in the study of the pore-level properties of filters, Chemical Engineering Science 66 (16) (2011) 3701-3709.

[4] G. M. Laudone, G. P. Matthews, A. S. Gregory, N. R. A. Bird, W. R. Whalley, A dual-porous, inverse model of water retention to study biological and hydrological interactions in soil, European Journal of Soil Science 64 (2013) 345-356.

[5] G. M. Laudone, C. M. Gribble, G. P. Matthews, Characterisation of the porous structure of Gilsocarbon graphite using pycnometry, cyclic porosimetry and void-network modeling, Carbon 73 (2014) 61-70. doi: 10.10164carbon.2014.02.037.

[6] X. Yan, X. YAN, Y. Tachibana, H. Ohashi, H. Sato, Y. Tazawa, K. Kunnitomi, A small modular reactor design for multiple energy applications: HTR50S, Nucl. Eng. Techno 45 (3) (2013) 401-414. doi:http://dx.doi.org/10.5516/NET.10.2012.070. URL //www.sciencedirect.com/science/articie/pii/S1738573315300267

[7] H. Zhen, L. Zhengcao, C. Dongyue, M. Wei, Z. Zhengjun, Co2 corrosion of IG-110 nuclear graphite studied by gas chromatography, J Nucl. Sci. Technol. 51 (4) (2014) 487-492. doi:http://dx.doi.org/10.1080/00223131.2013.877407.

[8] K. L. Jones, G. M. Laudone, G. P. Matthews, A multi-technique experimental and modelling study of the porous structure of IG-110 and IG-430 nuclear graphite, Carbon, in preparation.

[9] M. T. Miyahara, R. Numaguchi, T. Hiratsuka, K. Nakai, H. Tanaka, Fluids in nanospaces: molecular simulation studies to find out key mechanisms for engineering, Adsorption 20 (2) (2014) 213-223.

[10] C. J. Ridgway, P. A. C. Gane, J. Schoelkopf, Modified calcium carbonate coatings with rapid absorption and extensive liquid uptake capacity, Colloid. Surface. A. 236 (1-3) (2004) 91-102.

[11] C. L. Levy, G. P. Matthews, G. M. Laudone, C. M. Gribble, A. Turner, C. J. Ridgway, D. E. Gerard, J. Schoelkopf, P. A. C. Gane, Diffusion and Tortuosity in Porous Functionalized Calcium Carbonate, Industrial & Engineering Chemistry Research 54 (41) (2015) 9938-9947. doi: {10.1021/acsjecr.5b02362}.

[12] C. L. Levy, G. P. Matthews, G. M. Laudone, S. Beckett, A. Turner, J. Schoelkopf, P. A. C. Gane, Mechanism of adsorption of actives onto microporous functionalised calcium carbonate (FCC), Adsorption—Journal of the International Adsorption Society 23 (4) (2017) 603-612. doi: {10.1007/s10450-017-9880-7}.

[13] A. Johnson, I. Roy, G. Matthews, D. Patel, An improved simulation of void structure, water retention and hydraulic conductivity in soil with the Pore-Cor three-dimensional network, European Journal of Soil Science 54 (3) (2003) 477-489. doi:{10.1046/0365-2389.2003.00504.x}.

[14] N. Wardlaw, Y. Li, D. Forbes, Pore-Throat Size Correlation from CapillaryPressure Curves, Transport in Porous Media 2 (6) (1987) 597-614.

[15] K. Bezdek, S. Reid, Contact graphs of unit sphere packings revisited, Journal of Geometry 104 (1) (2013) 57-83.

[16] S. Savarmand, P. Carreau, F. Bertrand, D. Vidal, Models for the rheology of clay-gcc coating colors, TAPPI 10th Advanced Coating Fundamentals Symposium (2008).

[17] I. L. Hallin, G. Matthews, W. Whalley, G. van Keulen, S. Doerr, Core-scale wettability of naturally occurring transiently hydrophobic soils, in preparation.

The invention claimed is:

1. A pore analysis method comprising the steps of:
generating a model of a medium, the model comprising a regular array of pores, the pores being connected to adjacent ones of the pores by throats;
modifying the sizes of the pores and throats until the model of the medium is representative of the medium;
simulating, using the model, the effect of percolation of the medium using a fluid at a first pressure;
repeating the simulation step with progressively increasing intrusion pressures and noting, for each pore, the intrusion pressure at which intrusion of that pore occurs; and
identifying, from the information relating to the intrusion pressure at which intrusion of each pore occurs, at least one pore that should be treated, during further analysis, as comprising a cluster of voids,
wherein the pores identified as comprising clusters of voids are identified by determining a cluster ratio value for each pore, m, for which a distribution of pore sizes of the model does not have a spike or discontinuity at a maximum pore size of the distribution of pore sizes, the cluster ratio being defined as:

$$C_r = P_{intr,m}/P_{size,m}$$

wherein $P_{intr,m}$ is the simulated intrusion pressure of each pore, m, and $P_{size,m}$ is an expected size intrusion pressure of each pore, m.

2. The method according to claim 1, wherein a maximum cluster ratio value at which the distribution of pore sizes does not have a spike or discontinuity at the maximum pore size is identified on a trial and error basis.

3. The method according to claim 1, wherein the identification of pores as comprising clusters of voids allows a more accurate estimate of the void sizes within a porous sample in subsequent modeling of the sample.

4. The method according to claim 1, wherein the medium comprises one of mesoporous materials, microporous materials, nanoporous materials, sandstones, catalysts, paper coatings, filters, nuclear graphite, calcium carbonate mixtures and hydrophobic soil.

* * * * *